US012812286B2

(12) United States Patent
Zhang et al.

(10) Patent No.: US 12,812,286 B2
(45) Date of Patent: *Nov. 24, 2026

(54) OPEN EARPHONES

(71) Applicant: SHENZHEN SHOKZ CO., LTD., Shenzhen (CN)

(72) Inventors: Lei Zhang, Shenzhen (CN); Peigeng Tong, Shenzhen (CN); Guolin Xie, Shenzhen (CN); Yongjian Li, Shenzhen (CN); Jiang Xu, Shenzhen (CN); Tao Zhao, Shenzhen (CN); Duoduo Wu, Shenzhen (CN); Ao Ji, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 61 days.

This patent is subject to a terminal disclaimer.

(21) Appl. No.: 18/815,835

(22) Filed: Aug. 26, 2024

(65) Prior Publication Data

US 2024/0422469 A1 Dec. 19, 2024

Related U.S. Application Data

(63) Continuation of application No. PCT/CN2023/126051, filed on Oct. 23, 2023.

(30) Foreign Application Priority Data

Oct. 28, 2022 (CN) ......................... 202211336918.4
Dec. 1, 2022 (CN) ......................... 202223239628.6
(Continued)

(51) Int. Cl.
*H04R 1/10* (2026.01)
*H04R 1/1025* (2026.01)

(52) U.S. Cl.
CPC ........... *H04R 1/105* (2013.01); *H04R 1/1025* (2013.01); *H04R 2460/09* (2013.01)

(58) Field of Classification Search
CPC .. H04R 1/105; H04R 2460/09; H04R 5/0335; H04R 1/1025
(Continued)

(56) References Cited

U.S. PATENT DOCUMENTS 9,031,275 B2 5/2015 Brødsgaard
10,631,075 B1 4/2020 Patil et al.
(Continued)

FOREIGN PATENT DOCUMENTS

CN 201426167 Y 3/2010
CN 203968330 U 11/2014
(Continued)

OTHER PUBLICATIONS

International Search Report in PCT/CN2023/126051 mailed on Dec. 13, 2023, 7 pages.
(Continued)

*Primary Examiner* — Norman Yu
(74) *Attorney, Agent, or Firm* — METIS IP LLC

(57) ABSTRACT

An open earphone comprising a sound production component and an ear hook is provided. The ear hook includes a first portion and a second portion. The first portion is hung between an auricle and the head of a user, the second portion extends toward a front outer side of the auricle and connects to the sound production component, and the sound production component is located close to an ear canal but does not block the ear canal opening. The open earphone and the auricle have a first projection and an eighth projection on a sagittal plane, respectively, a centroid of a portion of the first projection corresponding to the sound production component have a first distance to a highest point of the eighth
(Continued)

100 projection in a vertical axis direction, and a ratio of the first distance to a height of the eighth projection is within a range of 0.35-0.6.

19 Claims, 19 Drawing Sheets

(30) Foreign Application Priority Data

| | | | |
|---|---|---|---|
| Dec. 30, 2022 | (WO) | ................ | PCT/CN2022/144339 |
| Mar. 2, 2023 | (WO) | ................ | PCT/CN2023/079401 |
| Mar. 2, 2023 | (WO) | ................ | PCT/CN2023/079409 |

(58) Field of Classification Search
USPC ........................ 381/71.6, 381, 309, 330, 370
See application file for complete search history.

(56) References Cited

U.S. PATENT DOCUMENTS

| | | | | |
|---|---|---|---|---|
| 10,951,970 | B1 | 3/2021 | Struzik et al. | |
| 11,736,850 | B1 * | 8/2023 | Liu | H04R 1/1091 381/370 |
| 11,838,705 | B2 | 12/2023 | Zheng et al. | |
| 11,968,489 | B1 | 4/2024 | Zhang et al. | |
| 11,974,084 | B1 | 4/2024 | Xu et al. | |
| 12,212,911 | B2 | 1/2025 | Zhang et al. | |
| 2003/0044038 | A1 | 3/2003 | Shirata | |
| 2007/0009133 | A1 | 1/2007 | Gerkinsmeyer | |
| 2007/0258613 | A1 | 11/2007 | Wright | |
| 2009/0175473 | A1 | 7/2009 | Wong et al. | |
| 2010/0061581 | A1 | 3/2010 | Soetejo et al. | |
| 2012/0070022 | A1 | 3/2012 | Saiki | |
| 2012/0134524 | A1 | 5/2012 | Peng | |
| 2013/0188803 | A1 | 7/2013 | Shaanan et al. | |
| 2016/0134957 | A1 * | 5/2016 | Jentz | H04R 1/105 381/380 |
| 2016/0381472 | A1 | 12/2016 | Feeley et al. | |
| 2017/0006387 | A1 | 1/2017 | Kah, Jr. | |
| 2017/0034611 | A1 | 2/2017 | Maruyama | |
| 2017/0359644 | A1 | 12/2017 | Cramer et al. | |
| 2020/0137476 | A1 | 4/2020 | Shinmen et al. | |
| 2020/0196062 | A1 | 6/2020 | Zhang | |
| 2020/0322712 | A1 | 10/2020 | Williams et al. | |
| 2021/0076118 | A1 | 3/2021 | Struzik et al. | |
| 2021/0112329 | A1 | 4/2021 | Zhang et al. | |
| 2021/0168483 | A1 | 6/2021 | Zhang et al. | |
| 2021/0195312 | A1 | 6/2021 | Woo et al. | |
| 2021/0345036 | A1 | 11/2021 | Van Hook et al. | |
| 2022/0014833 | A1 | 1/2022 | Lee | |
| 2022/0095029 | A1 | 3/2022 | Zheng et al. | |
| 2022/0124428 | A1 | 4/2022 | Zheng et al. | |
| 2022/0191607 | A1 | 6/2022 | Lee | |
| 2022/0386006 | A1 | 12/2022 | Meyberg Guzman et al. | |
| 2023/0061686 | A1 | 3/2023 | Wolfl | |
| 2023/0179907 | A1 | 6/2023 | Zhang et al. | |
| 2023/0308801 | A1 | 9/2023 | Schmidt et al. | |
| 2024/0107219 | A1 | 3/2024 | He | |
| 2024/0147111 | A1 | 5/2024 | Zhang et al. | |
| 2024/0236545 | A1 | 7/2024 | Xu et al. | |
| 2025/0184661 | A1 | 6/2025 | Wang et al. | |

FOREIGN PATENT DOCUMENTS

| | | | |
|---|---|---|---|
| CN | 210053540 | U | 2/2020 |
| CN | 110958526 | A | 4/2020 |
| CN | 210491148 | U | 5/2020 |
| CN | 212909891 | U | 4/2021 |
| CN | 113301463 | A | 8/2021 |
| CN | 214014498 | U | 8/2021 |
| CN | 214125513 | U | 9/2021 |
| CN | 113542956 | A | 10/2021 |
| CN | 113556638 | A | 10/2021 |
| CN | 113573215 | A | 10/2021 |
| CN | 215682610 | U | 1/2022 |
| CN | 114189778 | A | 3/2022 |
| CN | 114286239 | A | 4/2022 |
| CN | 114339511 | A | 4/2022 |
| CN | 216357249 | U | 4/2022 |
| CN | 216649963 | U | 5/2022 |
| CN | 115175069 | A | 10/2022 |
| EP | 4181531 | A1 | 5/2023 |
| JP | 2010193344 | A | 9/2010 |
| JP | 2011114454 | A | 6/2011 |
| JP | 2015070468 | A | 4/2015 |
| WO | 2021212702 | A1 | 10/2021 |

OTHER PUBLICATIONS

Written Opinion in PCT/CN2023/126051 mailed on Dec. 13, 2023, 8 pages.
International Search Report in PCT/CN2023/079409 mailed on Jun. 29, 2023, 6 pages.
Written Opinion in PCT/CN2023/079409 mailed on Jun. 29, 2023, 7 pages.
International Search Report in PCT/CN2023/079401 mailed on Jun. 29, 2023, 6 pages.
Written Opinion in PCT/CN2023/079401 mailed on Jun. 29, 2023, 5 pages.

* cited by examiner

OPEN EARPHONES

CROSS-REFERENCE TO RELATED APPLICATIONS

This application is a Continuation of International Patent Application No. PCT/CN2023/126051, filed on Oct. 23, 2023, which claims priority to Chinese Patent Application No. 202211336918.4, filed on Oct. 28, 2022, Chinese Patent Application No. 202223239628.6 filed on Dec. 1, 2022, International Patent Application No. PCT/CN2022/144339 filed on Dec. 30, 2022, and International Patent Application No. PCT/CN2023/079409 filed on Mar. 2, 2023, and International Patent Application No. PCT/CN2023/079401 filed on Mar. 2, 2023, the contents of each of which are incorporated herein by reference.

TECHNICAL FIELD

The present disclosure relates to the field of acoustic technology, in particular to open earphones.

BACKGROUND

With development of acoustic output technology, acoustic output devices (e.g., earphones) have been widely used in people's daily life. The acoustic output devices can be used with electronic devices, such as mobile phones, computers, etc., to provide a user with an auditory feast. An acoustic device may generally be classified into a head-mounted type, an ear-hook type, and an in-ear type according to ways the user wears the acoustic device. The output performance of the acoustic device and the wearing experience have a significant impact on the comfort of the user.

Therefore, it is desired to provide an open earphone to improve the output performance of the acoustic output device and the wearing experience.

SUMMARY

One of the embodiments of the present disclosure provides an open earphone comprising a sound production component and an ear hook including a first portion and a second portion connected in sequence. The first portion is hung between an auricle of a user and a head of the user, the second portion extends toward a front outer side of the auricle and connects to the sound production component, and the sound production component is located close to an ear canal but does not block the opening of the ear canal. The open earphone and the auricle have a first projection and an eighth projection on a sagittal plane, respectively, a centroid of a portion of the first projection corresponding to the sound production component have a first distance to a highest point of the eighth projection in a vertical axis direction, a ratio of the first distance to a height of the eighth projection in the vertical axis direction is within a range of 0.35-0.6. In a non-wearing state, a distance from a centroid of a projection of the sound production component on a first plane to a projection of the first portion of the ear hook in the first plane is within a range of 13 mm-38 mm.

One of the embodiments of the present disclosure also provides an open earphone comprising a sound production component and an ear hook including a first portion and a second portion connected in sequence. The first portion is hung between an auricle of a user and a head of the user, the second portion extends toward a front outer side of the auricle and connects to the sound production component, and the sound production component is located close to an ear canal but does not block the opening of the ear canal. The open earphone and the auricle have a first projection and an eighth projection on a sagittal plane, respectively, a centroid of a portion of the first projection corresponding to the sound production component have a first distance to a highest point of the eighth projection in a vertical axis direction, a ratio of the first distance to a height of the eighth projection in the vertical axis direction is within a range of 0.25-0.4. In a non-wearing state, a distance from a centroid of a projection of the sound production component on a first plane to a centroid of a projection of a first portion of the ear hook in the first plane is within a range of 10 mm-50 mm.

BRIEF DESCRIPTION OF THE DRAWINGS

The present disclosure is further illustrated by way of exemplary embodiments which are described in detail by way of the accompanying drawings. These embodiments are not limiting and in these embodiments the same numbering indicates the same structure where.

DETAILED DESCRIPTION

Figure 1:
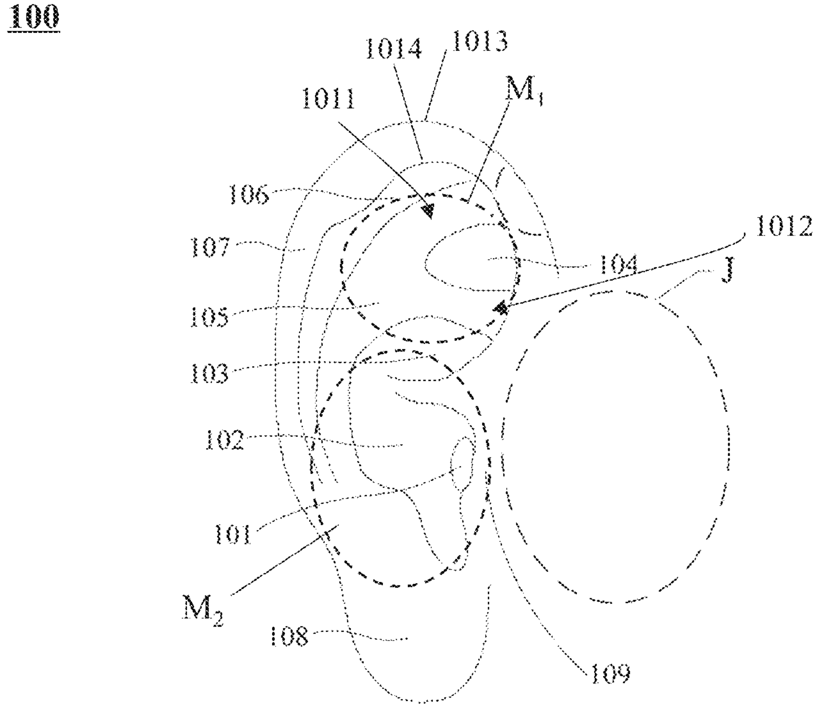
FIG. 1 is a schematic diagram illustrating an exemplary ear according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that “system”, “device”, “unit” and/or “module” as used herein is a manner used to distinguish different components, elements, parts, sections, or assemblies at different levels. However, if other words serve the same purpose, the words may be replaced by other expressions.

As shown in the present disclosure and claims, the words “one”, “a”, “a kind” and/or “the” are not especially singular but may include the plural unless the context expressly suggests otherwise. In general, the terms “comprise”, “comprises”, “comprising”, “include”, “includes”, and/or “including”, merely prompt to include operations and elements that have been clearly identified, and these operations and elements do not constitute an exclusive listing. The methods or devices may also include other operations or elements.

In the description of the present application, it is to be understood that the terms “first”, “second”, “third”, and “fourth”, etc., are used for descriptive purposes only, and are not to be understood as indicating or implying relative importance or implicitly specifying the number of technical features indicated. Therefore, the limitations “first”, “second”, “third”, and “fourth” may expressly or implicitly include at least one such feature. In the description of the present disclosure, “plurality” means at least two, e.g., two, three, and the like, unless explicitly and specifically limited otherwise.

In this application, unless otherwise expressly provided and limited, the terms “connecting”, “fixing”, etc., are to be construed broadly. For example, the term “connection” may refer to a fixed connection, a detachable connection, or a one-piece connection; a mechanical connection, or an electrical connection; a direct connection, an indirect connection through an intermediate medium, a connection within two elements, or an interaction between two elements, unless expressly limited otherwise. To one of ordinary skill in the art, the specific meaning of the above terms in the present disclosure may be understood on a case-by-case basis.

FIG. 1 is a schematic diagram illustrating an exemplary ear according to some embodiments of the present disclosure.

Referring to FIG. 1, the ear 100 may include an external ear canal 101, an inferior concha 102, a concha boat 103, a triangular fossa 104, an antihelix 105, a scapha 106, a helix 107, an earlobe 108, a helix foot 109, an outer contour 1013, and an inner contour 1014. It should be noted that, for the convenience of description, an upper antihelix crus 1011, a lower antihelix crus 1012 and the antihelix 105 are collectively referred to as an antihelix region in some embodiments of the present disclosure. In some embodiments, one or more parts of the ear 100 may be used to support an acoustic device to achieve a stable wearing of the acoustic device. In some embodiments, parts of the ear 100 such as the external ear canal 101, the inferior concha 102, the concha boat 103, the triangular fossa 104, etc., have a certain depth and volume in a three-dimensional space, which may be used to achieve wearing requirements of the acoustic device. For example, the acoustic device (e.g., an in-ear earphone) may be worn in the external ear canal 101. In some embodiments, the wearing of the acoustic device may be implemented using other parts of the ear 100 than the external ear canal 101. For example, the acoustic device may be worn through the concha boat 103, the triangular fossa 104, the antihelix 105, the scapha 106, the helix 107, or a combination thereof. In some embodiments, the earlobe 108 and other parts of the user’s ear may also be used to improve the comfort and reliability of the acoustic device in wearing. By using parts of the ear 100 other than the external ear canal 101 to wear the acoustic device and transmit a sound, the external ear canal 101 of the user’s ear may be “liberated”. When the user wears an acoustic device (e.g., the open earphone), the acoustic device does not block the user’s external ear canal 101 and the user may receive both sounds from the acoustic device and sounds (e.g., sirens, car bells, surrounding people, traffic directions, etc.) from the environment, thus reducing the probability of traffic accidents. In some embodiments, according to a structure of the ear 100, the acoustic device may be designed into a structure adapted to the ear 100, so as to realize a wearing of the sound production component of the acoustic device at different positions of the ear. For example, when the acoustic device is an open earphone, the open earphone may include a suspension structure (e.g., an ear hook) and a sound production component. The sound production component may be physically connected to the suspension structure, which may be adapted to a shape of the ear so as to place the whole or part of the sound production component of the auricle on a front side of the helix foot 109 (e.g., the region J enclosed by the dotted line in FIG. 1). As another example, the whole or part of the structure of the sound production component may be in contact with an upper part of the external ear canal 101 (e.g., a position where one or more parts of the helix foot 109, the concha boat 103, the triangular fossa 104, the antihelix 105, the scapha 106, the helix 107, etc., are located) when the user is wearing the open earphone. As another example, when the user wears the open earphone, the whole or part of the structure of the sound production component may be located within a cavity (e.g., a region M1 including at least the concha boat 103 and the triangular fossa 104 and a region M2 containing at least the inferior concha 102 enclosed by the dotted lines in FIG. 1) formed by one or more parts of the ear (e.g., the inferior concha 102, the concha boat 103, the triangular fossa 104, etc.).

Different users may have individual differences, resulting in different shapes, sizes and other dimensional differences of the ears. For ease of description and understanding, if not otherwise specified, the present disclosure primarily uses a "standard" shape and size ear model as a reference and further describes wearing manners of the acoustic device in different embodiments on the ear model. For example, a simulator based on ANSI: S3.36, S3.25 and IEC: 60318-7 containing the head and its (left and right) ear, e.g., GRAS 45BC KEMAR, may be used as a reference for wearing an acoustic device, thus presenting a scenario in which most users wear an acoustic device normally. By way of example only, the ear as a reference may have following relevant features: a projection of the auricle on a sagittal plane of the body may be in a range of 1300 $mm^2$ to 1700 $mm^2$. Thus, in the present disclosure, descriptions such as "worn by the user", "in a worn state" and "in a wearing state" may refer to the acoustic device described in the present disclosure being worn on the ear of the aforementioned simulator. Of course, considering individual differences of different users, structures, shapes, sizes, thicknesses, etc., of one or more parts of the ear 100 may be differentiated in design according to ears with different shapes and sizes. These differentiated designs may be expressed as feature parameters of one or more parts of the acoustic device (e.g., the sound production component, the ear hook, etc., hereinafter). The feature parameters may have values in different ranges, so as to adapt to different ears.

It should be noted that in the fields of medicine, anatomy, or the like, three basic sections including a sagittal plane, a coronal plane, and a horizontal plane of the human body may be defined, respectively, and three basic axes including a sagittal axis, a coronal axis, and a vertical axis may also be defined. As used herein, the sagittal plane may refer to a section perpendicular to the ground along a front-and-rear direction of the body, which divides the human body into a left part and a right part. The coronal plane may refer to a section perpendicular to the ground along a left-and-right direction of the body, which divides the human body into a front part and a rear part. The horizontal plane may refer to a section parallel to the ground along an up-and-down direction of the body, which divides the human body into an upper part and a lower part. Correspondingly, the sagittal axis may refer to an axis along the front-and-rear direction of the body and perpendicular to the coronal plane. The coronal axis may refer to an axis along the left-and-right direction of the body and perpendicular to the sagittal plane. The vertical axis may refer to an axis along the up-and-down direction of the body and perpendicular to the horizontal plane. Further, the term "front side of the ear" is used in the present disclosure as opposed to the concept of "rear side of the ear". The front side of the ear is located along the sagittal axis and on the side of the ear facing the facial region of the body, and the rear side of the ear is located along the sagittal axis and on the side of the ear facing away from the facial region of the body. Viewing the ear of the above simulator in the direction in which the coronal axis of the human body is located gives a schematic representation of the anterolateral profile of the ear as shown in FIG. 1.

The description of the ear 100 above is for illustration purposes only and is not intended to limit the scope of the present disclosure. For those of ordinary skill in the art, a wide variety of variations and modifications may be made in accordance with the description of the present disclosure. For example, the portion of the structure of the acoustic device may cover a portion or whole of the external ear canal 101. These changes and modifications remain within the scope of protection of the present disclosure.

Figure 2:
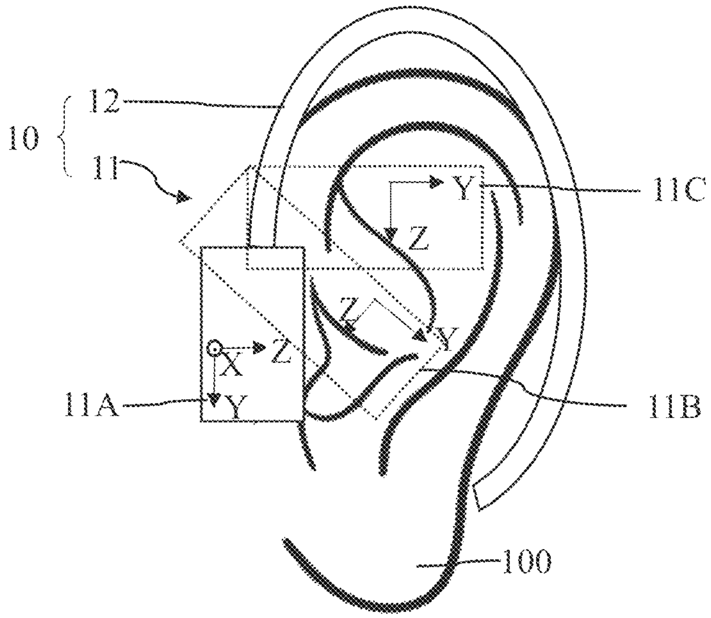
FIG. 2 is a schematic diagram illustrating an exemplary wearing of an open earphone according to some embodiments of the present disclosure.

FIG. 2 is a schematic diagram illustrating an exemplary wearing of an open earphone according to some embodiments of the present disclosure. As shown in FIG. 2, the open earphone 10 may include a sound production component 11 and a suspension structure 12. In some embodiments, the open earphone 10 may be worn on the user's body (e.g., a head, a neck or an upper torso of the human body) through the suspension structure 12 with the sound production component 11. In some embodiments, the suspension structure 12 may be an ear hook. The sound production component 11 is connected to one end of the ear hook, and the ear hook may be set in a shape adapted to the user's ear. For example, the ear hook may be in an arc-shaped structure. In some embodiments, the suspension structure 12 may also be a clamping structure adapted to the user's auricle so that the suspension structure 12 may be clamped at the user's auricle. In some embodiments, the suspension structure 12 may include, but is not limited to, an ear hook, an elastic band, etc., allowing the open earphone 10 to be well fixed to the user and prevent the user from dropping the open earphone 10 during using the open earphone 10.

In some embodiments, the sound production component 11 may be used to be worn on the user's body and the sound production component 11 may have a speaker therein to produce a sound for input to the user's ear 100. In some embodiments, the open earphone 10 may be combined with products such as glasses, earphones, head-mounted display devices, AR/VR earphones, etc., in which case the sound production component 11 may be fixed in the vicinity of the user's ear 100 by suspension or clamping. In some embodiments, the sound production component 11 may be circular, oval, polygonal (regular or irregular), U-shaped, V-shaped, semi-circular so that the sound production component 11 may be attached directly to the user's ear 100.

In conjunction with FIGS. 1 and 2, in some embodiments, at least a portion of the sound production component 11 may be located above, below, on the front side (e.g., a region J on the front side of the tragus illustrated in FIG. 1) or within the auricle (e.g., a region M1 or a region M2 illustrated in FIG. 1) of the user's ear 100 when the user is wearing the open earphone 10. An exemplary description may be given below in conjunction with different wearing positions (11A, 11B and 11C) of the sound production component 11. In some embodiments, the sound production component 11A is located on a side of the user's ear 100 along the sagittal axis towards the facial region of the body, i.e., the sound production component 11A is located in the facial region of the ear 100 towards the body (e.g., the region J illustrated in FIG. 1). Further, a speaker is provided inside the housing of the sound production component 11A, and the housing of the sound production component 11A may be provided with at least one sound guiding hole (not shown in FIG. 2), which may be located on a side wall of the housing towards or near the external ear canal of the user, and the speaker may output a sound to the user's ear canal through the sound guiding hole. In some embodiments, the speaker may include a diaphragm, a cavity inside the housing is separated by the diaphragm into at least a front cavity and a rear cavity, the sound guiding hole is acoustically coupled to the front cavity, the vibration of the diaphragm drives the air in the front cavity to vibrate to produce an air-conduction sound, and the air-conduction sound produced in the front cavity is transmitted to the outside world through the sound guiding hole. In some embodiments, the housing may also include one or more pressure relief holes. The pressure relief holes may be located on a side wall adjacent or opposite to the side wall where the sound guiding hole is located, the pressure relief holes are acoustically coupled to the rear cavity, the vibration of the diaphragm also drives the air in the rear cavity to generate vibration to produce an air-conduction sound, the air-conduction sound generated in the rear cavity may be transmitted to the outside world through the pressure relief holes. Exemplarily, in some embodiments, the speaker within the sound production component 11A may output a sound with a phase difference (e.g., an opposite phase) through the sound output hole and the pressure relief hole, which may be located on the side wall of the housing of the sound production component 11A facing the user's external ear canal 101, and the pressure relief hole may be located on a side of the housing of the sound production component 11 away from the user's external ear canal 101. The housing may act as a baffle to increase a sound range difference between the sound output hole and the pressure relief hole to the external ear canal 101 to increase the intensity of the sound at the external ear canal 101 while reducing a volume of a far-field sound leakage. In some embodiments, the sound production component 11 may have a long-axis direction Y and a short-axis direction Z that are perpendicular to the thickness direction X and orthogonal to each other. The long-axis direction Y may be defined as a direction having a largest extension dimension (e.g., when the projection shape is rectangular or approximately rectangular, the long-axis direction is a length direction of the rectangle or an approximately rectangle) in a shape of a two-dimensional projection plane (e.g., a projection of the sound production component 11 on a plane of an outer side surface of the sound production component 11, or a projection of the sound production component 11 on the sagittal plane) of the sound production component 11. The short-axis direction Z may be defined as a direction perpendicular to the long-axis direction Y in a shape of the projection of the sound production component 11 on the sagittal plane (e.g., when the projection shape is rectangular or approximately rectangular, the short-axis direction is a width direction of the rectangle or the approximately rectangle). The thickness direction X may be defined as a direction perpendicular to the two-dimensional projection plane (e.g., the same direction as the coronal axis that points to the left and right of the body). In some embodiments, when the sound production component 11 is tilted in the wearing state, the long-axis direction Y and the short-axis direction Z remain parallel or approximately parallel to the sagittal plane, the long-axis direction Y may be set at an angle to the sagittal axis direction, i.e. the long-axis direction Y is also set at an angle accordingly, and the short-axis direction Z may be set at an angle to a vertical axis direction, i.e., the short-axis direction Z is also set at an angle, as shown in FIG. 2 for the wearing situation of the sound production component 11B. In some embodiments, the whole or part of the structure of the housing of the sound production component 11B may extend into the inferior concha, i.e., the projection of the housing of the sound production component 11B on the sagittal plane has an overlapping portion with the projection of the inferior concha on the sagittal plane. For more information about the sound production component 11B, please refer to the contents of other parts of the present disclosure, for example, FIG. 3 and the descriptions thereof. In some embodiments, the sound production component may also be horizontal or approximately horizontal in the wearing state, as shown in the sound production component 11C of FIG. 2. The long-axis direction Y may be aligned or approximately aligned with the sagittal axis direction, and points to the front-and-rear direction of the body, and the short-axis direction Z may be aligned or approximately aligned with the vertical axis direction, and points to the up-and-down direction of the body. It should be noted that in the wearing state, the sound production component 11C is in an approximately horizontal state may refer that an angle between the long-axis direction and the sagittal axis of the sound production component 11C shown in FIG. 2 is within a specific range (e.g., no greater than 20°). Furthermore, the wearing position of the sound production component 11 is not limited to the sound production component 11A, the sound production component 11B, and the sound production component 11C shown in FIG. 2, but is sufficient to meet the region J, the region M1, or the region M2 shown in FIG. 1. For example, the whole or part of the structure of the sound production component 11 may be located on a front side of the helix foot 109 (e.g., the region J enclosed by the dotted line in FIG. 1). As another example, the whole or part of the structure of the sound production component may be in contact with an upper part of the external ear canal 101 (e.g., where one or more parts of the helix foot 109, the concha boat 103, the triangular fossa 104, the antihelix 105, the scapha 106, the helix 107, etc., are located). As another example, the whole or part of the structure of the sound production component of the acoustic device may be located within a cavity (e.g., the region M1 containing at least the concha boat 103, the triangular fossa 104 and with the region M2 containing at least the inferior concha 102 enclosed by the dotted lines in FIG. 1) formed by one or more parts (e.g., the inferior concha 102, the concha boat 103, the triangular fossa 104, etc.) of the ear.

In order to improve the stability of the open earphone 10 in the wearing state, the open earphone 10 may be used in any one of the following ways or a combination thereof. For one, at least part of the suspension structure 12 is provided with a profiling structure that fits to at least one of a rear side of the ear and the head to increase a contact area of the suspension structure 12 with the ear and/or the head, thereby increasing the resistance of the acoustic device 10 to dislodging from the ear. Secondly, at least part of the suspension structure 12 is provided with an elastic structure so that it has a certain deformation in the wearing state in order to increase the positive pressure of the suspension structure 12 on the ear and/or the head, thus increasing the resistance of the open earphone 10 to dislodging from the ear. Thirdly, the suspension structure 12 is provided, at least in part, to rest against the ear and/or head in the wearing state so as to create a reaction force that presses against the ear so that the sound production component 11 is pressed against the ear along the coronal axis away from the side of the body's head, thereby increasing the resistance of the open earphone 10 to dislodging from the ear. Fourthly, the sound production component 11 and the suspension structure 12 are set up to clamp the antihelix region, the region where the inferior concha is located, etc., from the front and rear sides of the ear in the wearing state, thus increasing the resistance of the open earphone 10 to dislodging from the ear. Fifthly, the sound production component 11 or the structure connected thereto is provided so as to extend at least partially into the cavities of the inferior concha 102, the concha boat 103, the triangular fossa 104, and the scapha 106, thereby increasing the resistance of the open earphone 10 to dislodging from the ear.

Figure 3:
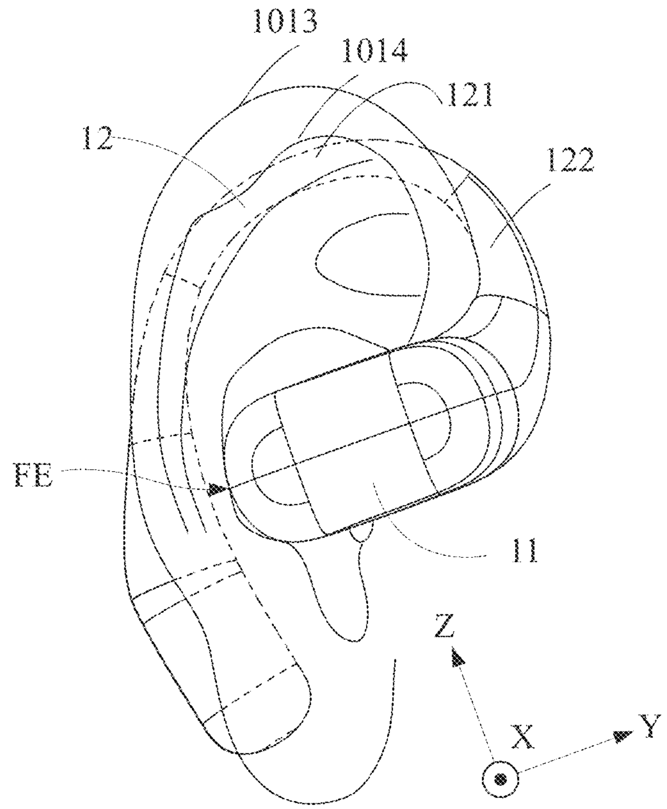
FIG. 3 is a schematic diagram illustrating an exemplary wearing of an open earphone according to some other embodiments of the present disclosure.

Exemplarily, in conjunction with FIG. 3, an end FE (also referred to as a free end) of the sound production component 11 may extend into the inferior concha in the wearing state. Optionally, the sound production component 11 and the suspension structure 12 may be set to jointly clamp the aforementioned ear region from the front and rear sides of the ear region corresponding to the inferior concha, thereby increasing the resistance of the open earphone 10 to dislodging from the ear and thus improving the stability of the open earphone 10 in the wearing state. For example, the end FE of the sound production component is pressed and held in the inferior concha in the thickness direction X. As another example, the end FE abuts in the long-axis direction Y and/or the short-axis direction Z within the inferior concha (e.g., against an inner wall of the opposite end FE of the inferior concha). It should be noted that the end FE of the sound production component 11 refers to an end of the sound production component 11 that is provided opposite a fixed end to which the suspension structure 12 is connected and is also referred to as the free end. The sound production component 11 may be a regular or irregularly shaped structure, and is illustrated here exemplarily to further illustrate the end FE of the sound production component 11. For example, when the sound production component 11 is a rectangular structure, an end wall of the sound production component 11 is flat, in which case the end FE of the sound production component 11 is the end side wall of the sound production component 11 opposite the fixed end to which the suspension structure 12 is attached. As another example, when the sound production component 11 is a sphere, an ellipsoid or an irregular structural body, the end FE of the sound production component 11 may refer to a specific region away from the fixed end obtained by cutting the sound production component 11 along the Y-Z plane (the plane formed by the short-axis direction Z and the thickness direction X), a ratio of a dimension of this specific region along the long-axis direction Y to a dimension of the sound production component along the long-axis direction Y may be in a range of 0.05-0.2.

By extending the sound production component 11 at least partially into the inferior concha, a listening volume at a listening position (e.g., at the opening of the ear canal (also referred to as the ear canal opening)) may be increased, especially at low and medium frequencies, while still maintaining a good far-field sound leakage cancellation effect. By way of illustration only, when the whole or part of the structure of the sound production component 11 extends into the inferior concha 102, the sound production component 11, and the inferior concha 102 form a structure similar to a cavity (hereinafter referred to as a cavity-like body), which in the embodiment of the present disclosure may be understood as a semi-enclosed structure enclosed by the side walls of the sound production component 11 jointly with the structure of the inferior concha 102, which is not completely closed off from the external environment but has a leakage structure (e.g., an opening, a gap, a pipeline, etc.) that is acoustically connected to the external environment. When the user wears the open earphone 10, one or more sound guiding holes may be provided on a side of the housing of the sound production component 11 near or towards the user's ear canal, and one or more pressure relief holes are provided on other side walls (e.g., the side walls away from or behind the user's ear canal) of the housing of the sound production component 11. The sound guiding holes is acoustically coupled to the front cavity of the open earphone 10 and the pressure relief holes are acoustically coupled to the rear cavity of the open earphone 10. Taking the sound production component 11 as an example, which includes a sound guiding hole and a pressure relief hole, a sound output from the sound guiding hole and a sound output from the pressure relief hole may be approximated as two sound sources, which are equal in size and opposite in phase. The sound production component 11 and a corresponding inner wall of the inferior concha form a cavity-like structure. A sound source corresponding to the sound guiding hole is located inside the cavity-like structure and a sound source corresponding to the pressure relief hole is located outside the cavity-like structure, thereby forming the acoustic model shown in FIG. 4.

Figure 4:
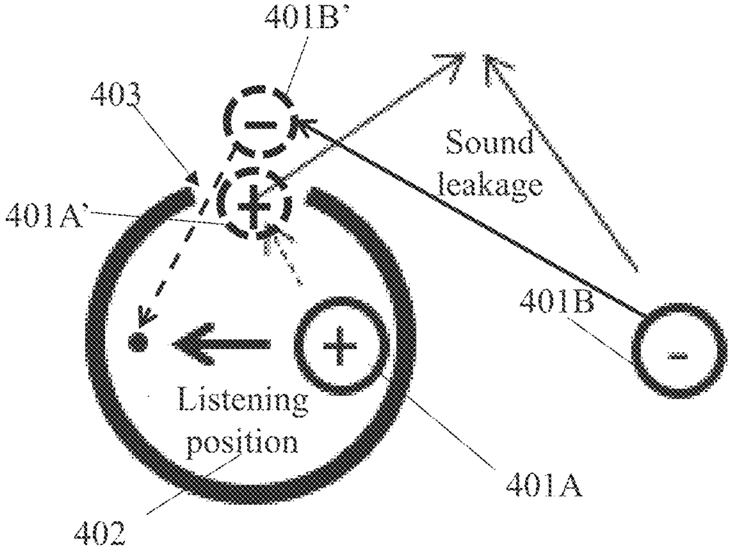
FIG. 4 is a schematic diagram illustrating an acoustic model formed by an open earphone according to some embodiments of the present disclosure.

FIG. 4 is a schematic diagram illustrating an acoustic model formed by an open earphone according to some embodiments of the present disclosure. As shown in FIG. 4, the cavity-like structure 402 may include a listening position and at least one sound source 401A. The "include" here may indicate that at least one of the listening position and the sound source 401A is inside the cavity-like structure 402, and the "include" may further refer that at least one of the listening position and the sound source 401A are at an inner edge of the cavity-like structure 402. The listening position may be equivalent to an entrance to the ear canal, an acoustic reference point in the ear such as an ear reference point (ERP), an ear-drum reference point (DRP), or an entrance structure oriented to the listener, etc. The sound source 401B is located on an outside of the cavity-like structure 402. The sound sources 401A and 401B, which are in opposite phase, output a sound into a surrounding space and interfere with each other to achieve the sound leakage phase cancellation effect. Specifically, as the sound source 401A is surrounded by the cavity-like structure 402, most of the sound output from the sound source reaches the listening position by a direct emission or a reflection. In contrast, without the cavity-like structure 402, most of the sound radiated from the sound source 401A may not reach the listening position. Therefore, the cavity structure makes it possible to significantly increase the volume of the sound reaching the listening position. At the same time, only a small part of the opposite phase sound output from the opposite phase sound source 401B outside the cavity-like structure 402 enters the cavity-like structure 402 through a leakage structure 403 of the cavity-like structure 402. This is equivalent to generating a secondary sound source 401B' at the leakage structure 403. An intensity of the secondary sound source 401B' is significantly smaller than the sound source 401B, and also significantly smaller than the sound source 401A. A sound produced by the secondary source 401B' has a weak effect of inverse phase cancellation on the sound source 401A in the cavity, resulting in a significant increase in the listening volume at the listening position. For the sound leakage, the sound source 401A outputs a sound to the outside through the leakage structure 402 of the cavity equivalent to the creation of the secondary sound source 401A' at the leakage structure 402. Since almost all the sound radiated by the sound source 401A is output from the leakage structure 403 and a volume of the cavity-like structure 402 is much smaller than a spatial volume for evaluating the sound leakage (a difference of at least one order of magnitude), an intensity of the secondary sound source 401A' may be considered comparable to that of the sound source 401A and still maintains a comparable sound leakage reduction effect.

In specific application scenarios, an outer wall surface of the housing of the sound production component 11 is usually flat or curved, while the contour of the user's inferior concha is uneven, and by extending part or the whole structure of the sound production component 11 into the inferior concha, a cavity-like structure is formed between the sound production component 11 and the contour of the inferior concha that is connected to the outside world. The acoustic model shown in FIG. 4 may be constructed by locating the pressure relief hole at the back or away from the ear canal opening, thereby enabling the user to improve the user's listening position at the ear opening and reduce the sound leakage effect in the far field when wearing the open earphone.

In some embodiments, the sound production component of the open earphone may include a transducer and a housing to accommodate the transducer. The transducer is an element that may receive an electrical signal and convert it into an acoustic signal for output. In some embodiments, differentiated by frequency, a type of transducer may include a low frequency (e.g., 30 Hz-150 Hz) speaker, a low and medium frequency (e.g., 150 Hz-500 Hz) speaker, a high and medium frequency (e.g., 500 Hz-5 kHz) speaker, a high frequency (e.g., 5 kHz-16 kHz) speaker or a full frequency (e.g., 30 Hz-16 kHz) speaker, or any combination thereof. The low frequency, the high frequency, etc., mentioned here only represent an approximate range of the frequency, and in different application scenarios, there may be different division modes. For example, a frequency division point may be determined. The low frequency may represent a frequency range below the frequency division point, and the high frequency may represent frequencies above the frequency division point. The frequency division point may be any value within the audible range of the human ear, for example, 500 Hz, 600 Hz, 700 Hz, 800 Hz, 1000 Hz, or the like.

In some embodiments, the transducer may include a diaphragm. When the diaphragm vibrates, sounds may be emitted from front and rear sides of the diaphragm respectively. In some embodiments, the front side of the diaphragm within the housing is provided with a front cavity (not shown) for the transmission of sounds. The front cavity is acoustically coupled with a sound guiding hole, and a sound on the front side of the vibration diaphragm may be emitted from the sound guiding hole through the front cavity. The housing is provided with a rear cavity (not shown) for the transmission of a sound at the rear side of the diaphragm. The rear cavity is acoustically coupled to the pressure relief hole and the sound from the rear side of the diaphragm may be emitted through the rear cavity from the pressure relief hole.

Referring to FIG. 3, the ear hook is illustrated here as an example of the suspension structure 12, in some embodiments, the ear hook may include a first portion 121 and a second portion 122 connected in sequence. The first portion 121 may be hung between the user's auricle and head and the second portion 122 may extend outwardly of the ear (a side of the ear that is away from the body's head along the coronal axis) and connect the sound production component so as to hold the sound production component in a position near the user's ear canal but without blocking the ear canal opening. In some embodiments, the sound guiding hole may be provided in a side wall of the housing towards the auricle, thereby transmitting the sound generated by the transducer out of the housing and into the user's ear canal opening.

In some embodiments, the ear hook itself is flexible and a relative position of the sound production component 11 and the ear hook may differ in the wearing and non-wearing states. For example, in order to facilitate wearing and to ensure stability after wearing, a distance between the end FE of the sound production component 11 and the ear hook in the non-wearing state is smaller than a distance between the end FE of the sound production component 11 and the ear hook in the wearing state, so that the sound production component 11 tends to move closer to the ear hook in the wearing state, creating a clamping force on the auricle. The wearing and non-wearing states of the open earphone 10 are described separately in the following sections.

In order to facilitate the understanding and description of the form of the open earphone 10 in the non-wearing state or in the wearing state, the open earphone 10 may be projected onto a specific plane and the open earphone 10 may be described by parameters related to a projection shape on that plane. By way of example only, in the wearing state, the open earphone 10 may be projected on the sagittal plane of the body to form a corresponding projection shape. In the non-wearing state, a first plane similar to this may be selected with reference to the relative position of the sagittal plane of the human body in relation to the open earphone 10, such that the projection shape formed by the projection of the open earphone 10 on the first plane is close to the projection shape formed by the projection of the open earphone 10 on the sagittal plane of the human body. For ease of description, with reference to FIG. 7, in some embodiments, the first plane 60 may be determined based on the form of the ear hook when the user is not wearing the open earphone 10. For example, the first plane 60 may be determined by placing the ear hook on a flat support surface (e.g., a horizontal table, a floor plane, etc.), which, when the ear hook is in contact with the support surface and placed smoothly, is the first plane 60 corresponding to the open earphone 10 at this time. In order to maintain a uniform shape of the specific plane corresponding to the wearing and non-wearing states, the first plane 60 may also be a sagittal plane of the human body, where the non-wearing state may be represented by removing the auricle structure from a human head model of the user and fixing the sound production component 11 to the human head model in the same posture as in the wearing state using a fixing member or glue. In some embodiments, the first plane 60 may also refer to a plane formed by a line of bisecting or approximately bisecting the ear hook along its length extension.

Figure 5A:
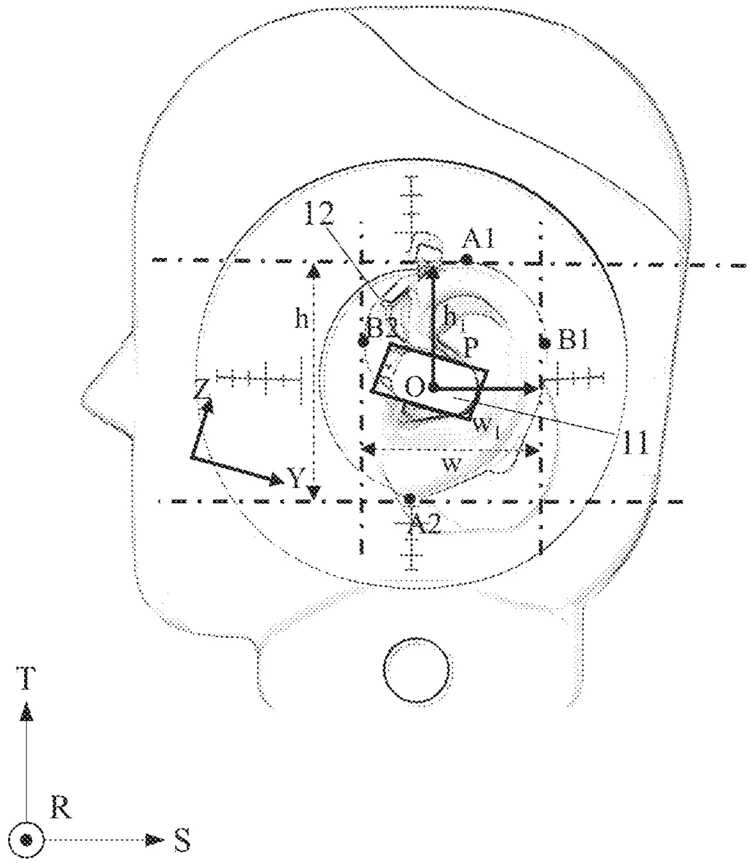
FIG. 5A a schematic diagram illustrating an exemplary wearing of an open earphone according to some embodiments of the present disclosure.

In conjunction with FIGS. 3 and 5A, in some embodiments, when the user wears the open earphone 10, the sound production component 11 may have a seventh projection on the sagittal plane (i.e., a plane formed by a T-axis and an S-axis in FIG. 5A) along a coronal axis direction R. A shape of the sound production component 11 may be a regular or irregular three-dimensional shape. Correspondingly, the seventh projection of the sound production component 11 on the sagittal plane may be a regular or irregular shape. For example, when the shape of the sound production component 11 is a cuboid, a quasi-cuboid shape, or a cylinder, the seventh projection of the sound production component 11 on the sagittal plane may be a rectangle or a quasi-rectangle shape (e.g., a racetrack shape). Considering that the seventh projection of the sound production component 11 on the sagittal plane may be the irregular shape, for the convenience of describing the seventh projection, a rectangular region shown in a solid line box P may be delineated around the projection (i.e., the seventh projection) of the sound production component 11 in FIG. 5A and FIG. 5B, and a centroid O of the rectangular region showed by the solid line box P may be approximately regarded as the centroid of the seventh projection. It should be noted that the above description about the seventh projection and the centroid thereof is only an example, and the shape of the seventh projection is related to the shape of the sound production component 11 or the wearing condition relative to the ear. The auricle may have an eighth projection on the sagittal plane along the coronal axis direction R. In order to make the open earphone 10 in the wearing state, at least part of the structure of the sound production component 11 may extend into the inferior concha (e.g., a position of the sound production component 11B relative to the ear as shown in FIG. 2). In some embodiments, a ratio of a distance h1 (also referred to as a first distance) between the centroid O of the seventh projection and a highest point of the eighth projection in a vertical axis direction (e.g., the T-axis direction in FIG. 5A) to a high h of the eighth projection in the vertical axis direction may be within a range of 0.35-0.6. In some embodiments, the sound production component 11 and the suspension structure 12 may be two independent structures or an integrated structure. In order to describe the seventh projection region of the sound production component more clearly, a thickness direction X, a long-axis direction Y, and a short-axis direction Z may be introduced according to a three-dimensional structure of the sound production component 11. The long-axis direction Y and the short-axis direction Z are perpendicular, and the thickness direction X may be perpendicular to a plane formed by the long-axis direction Y and the short-axis direction Z. Merely by way of example, the confirmation process of the solid line box P may be as follows: two farthest points of the sound production component 1 in the long-axis direction Y may be determined, and a first line segment and a second line segment parallel to the short-axis direction Z through these two farthest points may be drawn, respectively; two farthest points of the sound production component 11 in the short-axis direction Z may be determined, a third line segment and a fourth line segment parallel to the long-axis direction Y through these two farthest points may be drawn, and the rectangular region of the solid line box P in FIG. 5A and FIG. 5B may be obtained by a region formed by the above line segments.

In some embodiments, in order to allow the whole or part of the structure of the sound production component 11 to extend into the inferior concha, a ratio of a distance w1 (also referred to as a second distance) between the centroid O of the seventh projection and an end point of the eighth projection in the sagittal axis direction (e.g., in an S-axis direction as shown in FIG. 5A) to a width w of the eighth projection in the sagittal axis direction may be within a range of 0.4-0.7.

The highest point of the eighth projection may be understood as a point with a largest distance in the vertical axis direction relative to the projection of a certain point on the neck of the user on the sagittal plane among all the projection points, i.e., a projection of the highest point of the auricle (e.g., point A1 in FIG. 5A) on the sagittal plane may be the highest point of the eighth projection. A lowest point of the eighth projection may be understood as a point with a smallest distance in the vertical axis direction relative to the projection of a certain point of the neck of the user on the sagittal plane among all the projection points, i.e., a projection of the lowest point of the auricle (e.g., point A2 in FIG. 5A) on the sagittal plane may be the lowest point of the eighth projection. A height of the eighth projection in the vertical axis direction may be a difference (height h shown in FIG. 5A) between the point with the largest distance and the point with the smallest distance in the vertical axis direction and the smallest point of the projection relative to a projection of a certain point of the neck of the user on the sagittal plane among all the projection points in the eighth projection, i.e., the distance between point A1 and point A2 in the vertical axis direction T. The end point of the eighth projection may be understood as a point with the largest distance in the sagittal axis direction relative to the projection of the nose tip of the user on the sagittal plane among all the projection points, i.e., the projection of the end point of the auricle (e.g., point B1 in FIG. 5A) on the sagittal plane may be the end point of the eighth projection. The front end point of the eighth projection may be understood as a point with the smallest distance in the sagittal axis direction relative to the projection of the nose tip of the user on the sagittal plane among all projection points, i.e., the projection of the front end point of the auricle (e.g., point B2 shown in FIG. 5) on the sagittal plane may be the front end point of the eighth projection. The width of the eighth projection in the sagittal axis direction may be a difference (the width w shown in FIG. 5A) between the point with the largest distance and the point with the smallest distance along the sagittal axis direction relative to the projection of the nose tip on the sagittal plane among all projection points in the eighth projection, i.e., the distance between the point B1 and the point B2 in the sagittal axis direction S. It should be noted that the projections of structures such as the sound production component 11 or the auricle on the sagittal plane in the embodiments of the present disclosure refer to projections on the sagittal plane along the coronal axis direction R, which is not emphasized in the disclosure hereinafter.

It should be noted that an area of the seventh projection of the sound production component 11 on the sagittal plane may be generally much smaller than an area of a projection of the auricle on the sagittal plane, to ensure that the ear canal opening of the user may not be blocked when the user wears the open earphone 10, and the load on the user when wearing the open earphone may be reduced, which is convenient for the user to carry daily. On this premise, in the wearing state, when the ratio of the distance h1 between the centroid O of the projection (the seventh projection) of the sound production component 11 on the sagittal plane and the projection (the highest point of the eighth projection) of the highest point A1 of the auricle on the sagittal plane in the vertical axis direction to the height h of the eighth projection in the vertical axis direction is too small or too large, part of the structure of the sound production component 11 may be located above the top of the auricle or at the earlobe of the user, which may be impossible to use the auricle to sufficiently support and limit the sound production component 11, and there may be a problem that the wearing is unstable and easy to fall off. On the other hand, it may also cause the sound guiding hole set on the sound production component 11 to be away from the ear canal opening, affecting the listening volume at the ear canal opening of the user. In order to ensure that the open earphone does not block the ear canal opening of the user and ensure the stability and comfort of the user wearing the open earphone and a good listening effect, in some embodiments, the ratio of the distance h1 between the centroid O of the seventh projection and the highest point A1 of the eighth projection in the vertical axis direction to the height h of the eighth projection in the vertical axis direction may be controlled to be within a range of 0.35-0.6, so that when part or the whole structure of the sound production component extends into the inferior concha, the force exerted by the inferior concha on the sound production component 11 may support and limit the sound production component 11 to a certain extent, thereby improving the wearing stability and comfort of the open earphone. Meanwhile, the sound production component 11 may also form the acoustic model shown in FIG. 4 with the inferior concha, to ensure the listening volume of the user at the listening position (e.g., the ear canal opening) and reduce the far-field leakage volume. Preferably, the ratio of the distance h1 between the centroid O of the seventh projection and the highest point A1 of the eighth projection in the vertical axis direction to the height h of the eighth projection in the vertical axis direction may be controlled to be within a range of 0.35-0.55. More preferably, the ratio of the distance h1 between the centroid O of the seventh projection and the highest point of the eighth projection in the vertical axis direction to the height h of the eighth projection in the vertical axis direction may be controlled to be within a range of 0.4-0.5.

Similarly, when the ratio of the distance w1 between the centroid O of the seventh projection and the end point of the eighth projection in the sagittal axis direction to the width w of the eighth projection in the sagittal axis direction is too large or too small, the part of whole structure of the sound production component 11 may be located in a facial region on the front side of the ear, or extend out of the outer contour of the auricle, which may also cause the problem that the sound production component 11 cannot construct the acoustic model in FIG. 4 with the inferior concha, and also lead to unstable wearing of the open earphone 10. According to the open earphone provided in the embodiments of the present disclosure, the ratio of the distance w1 between the centroid O of the seventh projection and the end point of the eighth projection in the sagittal axis direction to the width w of the eighth projection in the sagittal axis direction may be controlled to be within a range of 0.4-0.7, thereby improving the wearing stability and comfort of the open earphone while ensuring the acoustic output effect of the sound production component. Preferably, the ratio of the distance w1 between the centroid O of the seventh projection and the end point of the eighth projection in the sagittal axis direction to the width w of the eighth projection in the sagittal axis direction may be controlled to be within a range of 0.45-0.68. More preferably, the ratio of the distance w1 between the centroid O of the seventh projection and the end point of the eighth projection in the sagittal axis direction to the width w of the eighth projection in the sagittal axis direction may be controlled to be within a range of 0.5-0.6.

For example, the height h of the eighth projection in the vertical axis direction may be within a range of 55 mm-65 mm. In the wearing state, if the distance h1 between the centroid O of the seventh projection and the highest point of the eighth projection in the vertical axis direction is less than 15 mm or greater than 50 mm, the sound production component 11 may be located away from the inferior concha, which not only fails to construct the acoustic model in FIG. 4, but also has the problem of unstable wearing. Therefore, in order to ensure the acoustic output effect of the sound production component and the wearing stability of the open earphone, the distance h1 between the centroid O of the seventh projection and the highest point of the eighth projection in the vertical axis direction may be controlled to be within a range of 15 mm-50 mm. Similarly, in some embodiments, the width of the eighth projection in the sagittal axis direction may be within a range of 40 mm-55 mm. When the distance between the centroid O of the seventh projection and the end point of the eighth projection in the sagittal axis direction is greater than 45 mm or less than 15 mm, the sound production component 11 may be too forward or too backward relative to the ear of the user, causing that the sound production component 11 may not construct the acoustic model in FIG. 4 and the unstable wearing of the open earphone 10. Therefore, in order to ensure the acoustic output effect of the sound production component 11 and the wearing stability of the open earphone, the distance between the centroid O of the seventh projection and the end point of the eighth projection in the sagittal axis direction may be controlled to be within a range of 15 mm-45 mm.

Figure 8:
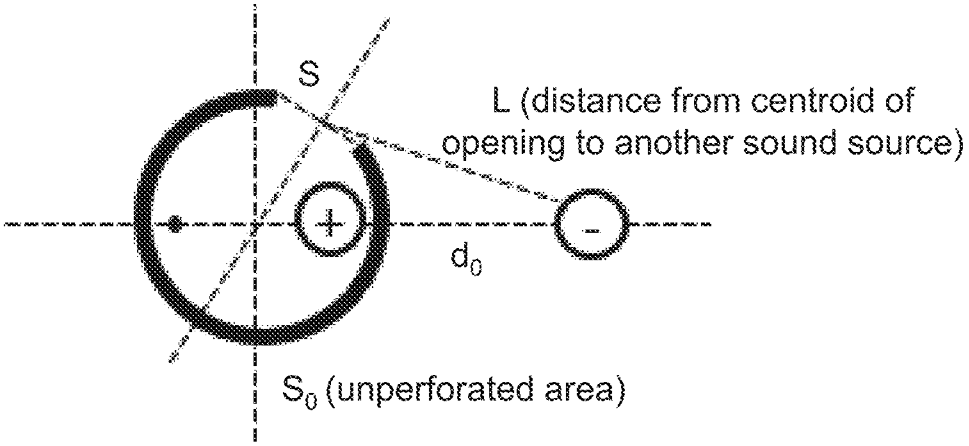
FIG. 8 is a schematic diagram illustrating a cavity-like structure according to some embodiments of the present disclosure.
Figure 9:
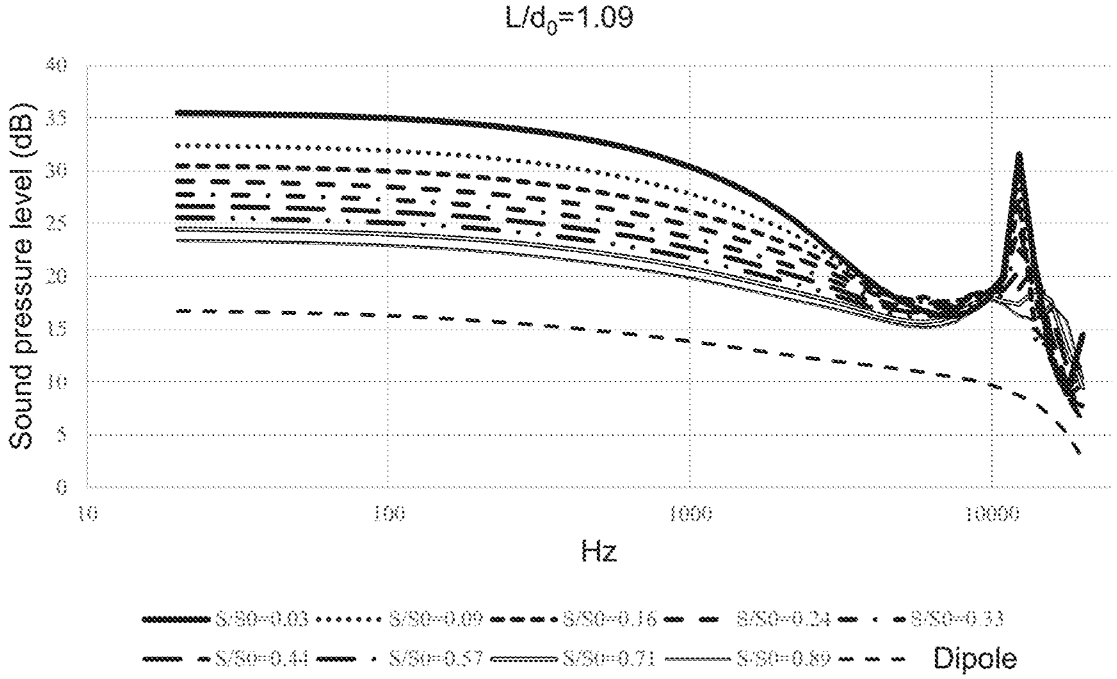
FIG. 9 is a graph illustrating listening indices of cavity-like structures with leakage structures of different sizes according to some embodiments of the present disclosure.

As mentioned above, when the user wears the open earphone 10, at least part of the sound production component 11 may extend into the inferior concha of the user to form the acoustic model in FIG. 4. The outer wall surface of the housing of the sound production component 11 may usually be the plane or the curved surface, and the contour of the inferior concha of the user may be the uneven structure. When the part of whole structure of the sound production component 11 extends into the inferior concha, a gap may be formed as the sound production component 11 cannot be closely fit with the inferior concha. The gap may correspond to the leakage structure 403 in FIG. 4. FIG. 8 is a schematic diagram illustrating a cavity-like structure according to some embodiments of the present disclosure. FIG. 9 is a graph illustrating listening indices of cavity-like structures with leaking structures of different sizes according to some embodiments of the present disclosure. As shown in FIG. 8, an opening area of the leakage structure on the cavity-like structure may be represented as S, and an area of the cavity-like structure directly affected by a contained sound source (e.g., "+" shown in FIG. 8) may be represented as S0. The "directly affected" here means that the sound emitted by the contained sound source may directly acoustically act on a wall of the cavity-like structure without passing through the leakage structure. A distance between two sound sources is d0, and a distance from a center of an opening shape of the leakage structure to another sound source (e.g., "−" in FIG. 8) is L. As shown in FIG. 9, keeping L/d0=1.09 constant, the larger the relative opening size S/S0, the smaller the listening index. This is because the larger the relative opening, the more sound components that the contained sound source radiates directly outward, and the less sound reaching the listening position, causing the listening volume to decrease with the increase of the relative opening, which in turn leads the decrease of the listening index. It may be inferred that the larger the opening, the lower the listening volume at the listening position.

In some embodiments, considering that the relative position of the sound production component 11 and the ear canal of the user (e.g., the inferior concha) may affect a size of the gap formed between the sound production component 11 and the inferior concha, e.g., when the end FE of the sound production component 11 abuts against the inferior concha, the size of the gap may be relatively small, and when the end FE of the sound production component 11 does not abut against the inferior concha, the size of the gap may be relatively large. The gap formed between the sound production component 11 and the inferior concha may be referred to as the leakage structure in the acoustic model in FIG. 4. The relative position of the sound production component 11 and the ear canal of the user (e.g., the inferior concha) may affect a count of the leakage structures of the cavity-like structure formed by the sound production component 11 and the inferior concha and the opening size of the leakage structure, and the opening size of the leakage structure may directly affect the listening quality. Specifically, the larger the opening of the leakage structure, the more sound components that the sound production component 11 radiate directly outward, and the less sound reaching the listening position. Accordingly, in order to consider the listening volume of the sound production component 11 and the sound leakage reduction effect to ensure the acoustic output quality of the sound production component 11, the sound production component 11 may be fit as closely as possible to the inferior concha of the user. Correspondingly, the ratio of the distance h1 between the centroid O of the seventh projection and the highest point of the eighth projection in the vertical axis direction to the height h of the eighth projection in the vertical axis direction may be controlled to be within a range of 0.35-0.6, while the ratio of the distance w1 between the centroid O of the seventh projection and the end point of the eighth projection in the sagittal axis direction to the width w of the eighth projection in the sagittal axis direction may be controlled to be within a range of 0.4-0.65. Preferably, in some embodiments, in order to improve the wearing comfort of the open earphone while ensuring the acoustic output quality of the sound production component 11, the ratio of the distance h1 between the centroid O of the seventh projection and the highest point of the eighth projection in the vertical axis direction to the height h of the eighth projection in the vertical axis direction may be within a range of 0.35-0.55, and the ratio of the distance w1 between the centroid O of the seventh projection and the end point of the eighth projection in the sagittal axis direction to the width w of the eighth projection in the sagittal axis direction may be within a range of 0.45-0.68. More preferably, the ratio of the distance h1 between the centroid O of the seventh projection and the highest point of the eighth projection in the vertical axis direction to the height h of the eighth projection in the vertical axis direction may be within a range of 0.35-0.5, and the ratio of the distance w1 between the centroid O of the seventh projection and the end point of the eighth projection in the sagittal axis direction to the width w of the eighth projection in the sagittal axis direction may be within a range of 0.48-0.6.

In some embodiments, considering that there may be certain differences in the shape and size of the ears of different users, the ratio range may fluctuate within a certain range. For example, when the earlobe of the user is long, the height h of the eighth projection in the vertical axis direction may be larger than that of the general situation. At this time, when the user wears the open earphone 100, the ratio of the distance h1 between the centroid O of the seventh projection and the highest point of the eighth projection in the vertical axis direction to the height h of the eighth projection in the vertical axis direction may be smaller, e.g., which may be within a range of 0.2-0.55. Similarly, in some embodiments, when the helix of the user is bent forward, the width w of the eighth projection in the sagittal axis direction be smaller than that of the general situation, and the distance w1 between the centroid O of the seventh projection and the end point of the eighth projection in the sagittal axis direction may also be relatively small. At this time, when the user wears the open earphone 100, the ratio of the distance w1 between the centroid O of the seventh projection and the end point of the eighth projection in the sagittal axis direction to the width w of the eighth projection in the sagittal axis direction may be larger, e.g., which may be within a range of 0.4-0.75.

Figure 5B:
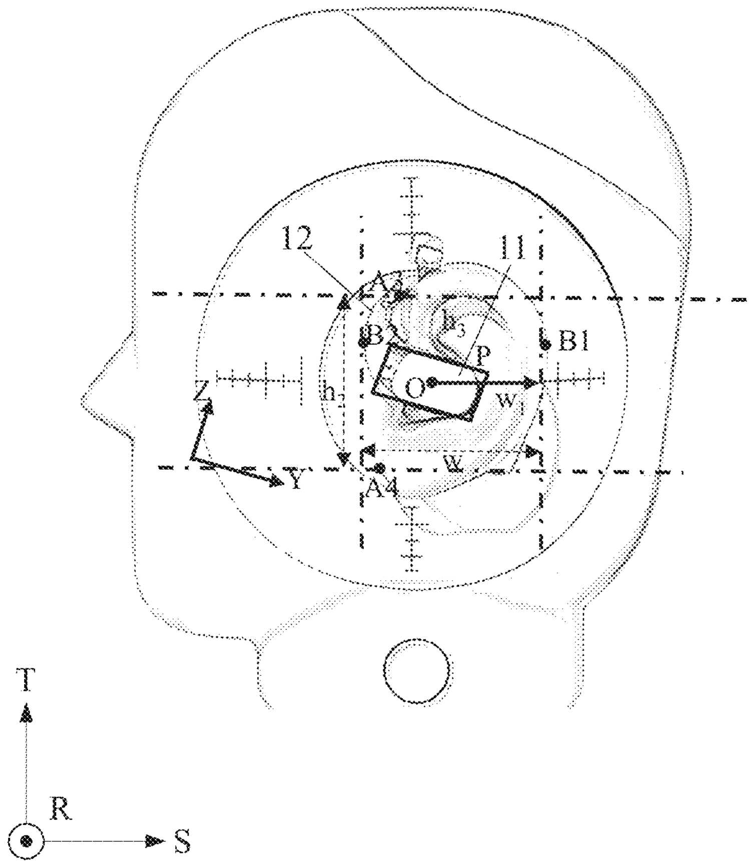
FIG. 5B is a schematic diagram illustrating an exemplary wearing of an open earphone according to some embodiments of the present disclosure.
Figure 5C:
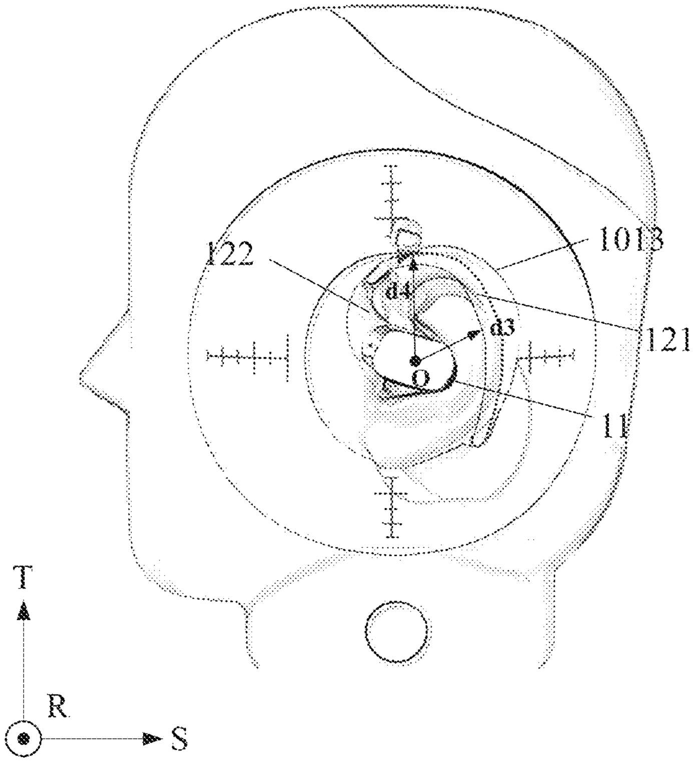
FIG. 5C is a schematic diagram illustrating an exemplary wearing of an open earphone according to some embodiments of the present disclosure.

The ears of different users are different. For example, some users have longer earlobes. At this time, it may have an effect if the open earphone 10 is defined using the ratio of the distance (a seventh distance) between the centroid O of the seventh projection and the highest point of the eighth projection to the height of the eighth projection on the vertical axis. As shown in FIG. 5B, a highest point A3 and a lowest point A4 of a connection region between the auricle of the user and the head of the user may be selected for illustration. The highest point of the connection part between the auricle and the head may be understood as a position where the projection of the connection region of the auricle and the head on the sagittal plane has a largest distance from a projection of a specific point on the neck on the sagittal plane. The lowest point of the connection part between the auricle and the head may be understood as a position where the projection of the connection region of the auricle and the head on the sagittal plane has a smallest distance from a projection of a specific point on the neck on the sagittal plane. In order to consider the listening volume of the sound production component 11 and the sound leakage reduction effect to ensure the acoustic output quality of the sound production component 11, the sound production component 11 may be fit as closely as possible to the inferior concha of the user. Correspondingly, a ratio of a distance h3 between the centroid O of the seventh projection and a highest point of a projection of the connection region of the auricle and the head on the sagittal plane in the vertical axis direction to a height h2 between a highest point and a lowest point of the projection of the connection region of the auricle and the head on the sagittal plane in the vertical axis direction may be controlled to be within a range of 0.4-0.65. Preferably, in some embodiments, in order to improve the wearing comfort of the open earphone while ensuring the acoustic output quality of the sound production component 11, the ratio of the distance h3 between the centroid O of the seventh projection and the highest point of the projection of the connection region of the auricle and the head on the sagittal plane in the vertical axis direction to the height h2 between the highest point and the lowest point of the projection of the connection region of the auricle and the head on the sagittal plane in the vertical axis direction may be controlled to be within a range of 0.45-0.6. More preferably, the ratio of the distance h3 between the centroid O of the seventh projection and the highest point of the projection of the connection region of the auricle and the head on the sagittal plane in the vertical axis direction to the height h2 between the highest point and the lowest point of the projection of the connection region of the auricle and the head on the sagittal plane in the vertical axis direction may be within a range of 0.5-0.6.

Figure 6:
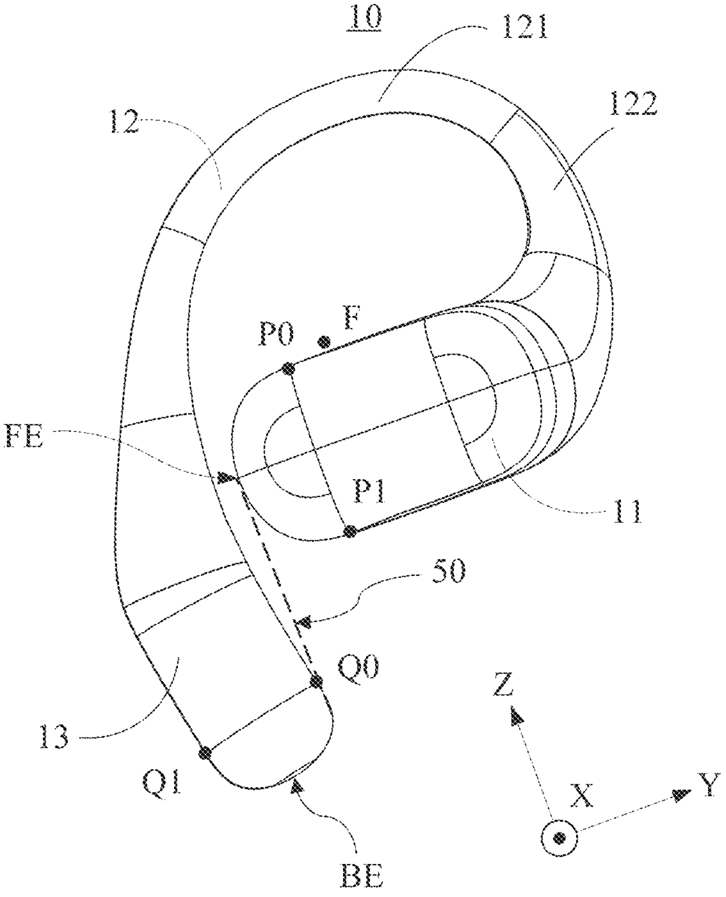
FIG. 6 is a schematic diagram illustrating an open earphone in a non-wearing state according to some embodiments of the present disclosure.
Figure 7:
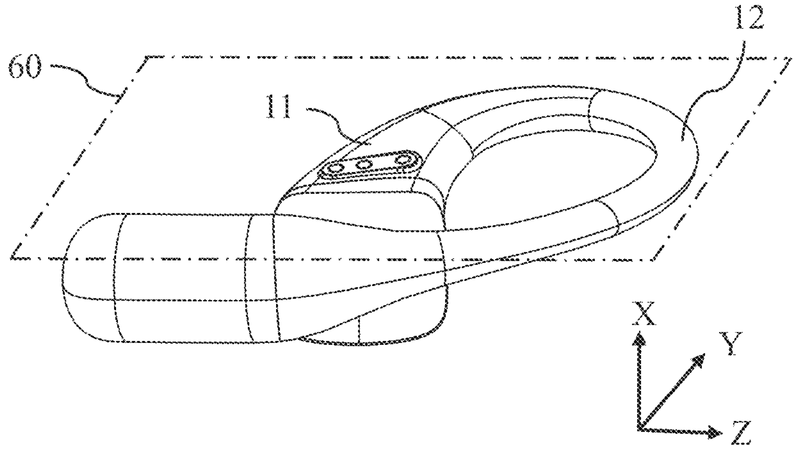
FIG. 7 is a schematic diagram illustrating a projection formed by projecting an open earphone on a first plane in a non-wearing state according to some embodiments of the present disclosure.

In conjunction with FIGS. 6 and 7, in some embodiments, the open earphone 10 may form a first projection on the first plane 60 (e.g., the sagittal plane), the first projection includes an outer contour, a first end contour, an inner contour, and a second end contour. The first end contour may be a projection contour of the end FE of the sound production component 11 on the first plane 60, two end points P0 and P1 of the first end contour being projection points of the end FE at the junction with the rest of the sound production component 11 on the first plane 60, the division of the end FE can be seen in the relevant description in FIG. 3 of the present disclosure. The second end contour may be a projection contour of the free end BE of the suspension structure 12 on the first plane 60, with two endpoints Q0 and Q1 of the second end contour being projection points of the free end BE at the junction with the rest of the suspension structure 12 on the first plane 60. The outer contour may be a contour where the first projection lies between the point P1 and the point Q1. The inner contour may be a contour where the first projection lies between the point P0 and the point Q0.

It should be noted that the free end BE of the suspension structure 12 may be at least part of a region in an end of a first portion of the suspension structure 12 that is away from a second portion. The end of the first portion of the suspension structure 12 away from the second portion may be a regular or irregularly shaped structure, which is illustrated here exemplarily in order to further illustrate the free end BE of the suspension structure 12. For example, if the first portion of the suspension 12 is a rectangular structure at one end away from the second portion, an end wall thereof is flat, in which case the free end BE of the suspension structure 12 is an end side wall of the first portion of the suspension structure 12 at one end away from the second portion. As another example, when the first portion of the suspension structure 12 at one end away from the second portion is a sphere, an ellipsoid, or an irregular structure, the free end BE of the suspension structure 12 may be a region obtained by extending a specific distance into the second portion in an extension direction of the first portion of the suspension structure 12 from the furthest position away from the second portion, a ratio of this specific distance to the total extension distance of the first portion of the suspension structure 12 may be in a range of 0.05-0.2.

Taking the projection of the sound production component 11 on the first plane 60 as a rectangular-like shape (e.g., runway shape), there are parallel or approximately parallel upper and lower side wall projections in the projection of the sound production component 11, and a first end contour connecting the upper and lower side wall projections, the first end contour may be a straight line segment or a circular arc, with points P0 and P1 indicating the two ends of the first end contour respectively. By way of exemplary illustration only, the point P0 may be a junction point between an arc formed by the end FE projection and the line segment of the upper side wall projection and, similarly to the point P0, the point P1 may be a junction point between an arc formed by the end FE projection and the line segment of the lower side wall projection. Similarly, the ear hook has a free end at an end away from the sound production component 11. A projection of the free end of the ear hook on the first plane 60 forms a second end contour, which may be a straight line segment or an arc, with points Q0 and Q1 indicating the two ends of the second end contour respectively. In some embodiments, the points Q0 and Q1 may be two end points of a line segment or arc projected from the free end of the first portion 121 of the ear hook in a direction away from the second portion 122 of the ear hook on the first plane 60, and further, the end point close to the sound production component 11 in the long-axis direction Y of the sound production component 11 is the point Q0 and the end point away from the sound production component 11 is the point Q1.

The shape of the projection of the open earphone 10 on the first plane 60 and the sagittal plane of the human body may reflect the manner in which the open earphone 10 is worn in the ear. For example, the area of the first projection may reflect a region of the ear that can be covered by the open earphone 10 in the wearing state, and the manner in which the sound production component 11 and the ear hook come into contact with the ear. In some embodiments, the inner contour, the outer contour, the first end contour, and the second end contour in the first projection form a non-enclosed region because the sound production component 11 is not in contact with the first portion 121 of the ear hook. A size of this region is closely related to the wearing effect of the open earphone 10 (e.g., a stability of wearing, a sound production position, etc.). For ease of understanding, in some embodiments, a tangent segment 50 connecting the first end contour and the second end contour may be identified and an area enclosed by a third closed curve jointly defined by the tangent segment 50, the inner contour, the first end contour, and the second end contour is taken as a third area of the first projection.

In some embodiments, the wearing position of the sound production component 11 (i.e., the relative position of the sound production component 11 and the user's ear canal or the inferior concha) affects the third area of the first projection on the sagittal plane formed by the open earphone 10, which in turn affects the count of the leakage structures of the cavity-like structure formed by the sound production component 11 with the user's inferior concha and the opening size of the leakage structure. The opening size of the leakage structure may directly affect the listening quality. Specifically, if the third area is too large, the sound production component 11 does not abut against the edge of the inferior concha, resulting in that the opening of the leakage structure of the cavity-like structure formed by the sound production component 11 and the inferior concha is too large, the sound component directly radiated outward by the sound guiding hole is increased, and sound reaching the listening position is reduced, which in turn leads to a reduction in the sound production efficiency of the sound production component 11. The sound production efficiency may be understood as a ratio of the listening volume at the ear canal opening to the far-field leakage volume. In addition, if the third area is too large, the clamping effect of the ear hook to the sound production component 11 may be reduced, which may lead to unstable wearing. Based on this, the third area of the third closed curve should not be too large. In some embodiments, taking into account the overall structure of the open earphone 10, and the need for the shape of the ear hook to adapt to the space between the ear and the head, etc., the third area of the third closed curve does not exceed 600 $mm^2$. In some embodiments, if the third area too small, a distance between the ear hook (e.g., an upper vertex of the ear hook) and the sound production component 11 may be too small or the clamping force between the ear hook and the sound production component 11 on the user's ear may be too strong, which may affect the wearing comfort of the open earphone 10. Based on this, the third area of the third closed curve should not be too small. In some embodiments, the third area may be not less than 200 $mm^2$. In some embodiments, taking into account the sound generation efficiency of the open earphone 10 and the wearing stability and comfort, the third area of the third closed curve may be within a range of 200 $mm^2$-600 $mm^2$. In some embodiments, the third area of the third closed curve may be within a range of 300 $mm^2$-500 $mm^2$ in order to reduce the sound radiated directly outwardly by the sound production component 11, to ensure the listening volume of the open earphone 10 at the listening position (e.g., at the ear canal opening), and to improve the comfort and stability of the user while wearing the earphone.

Figure 10:
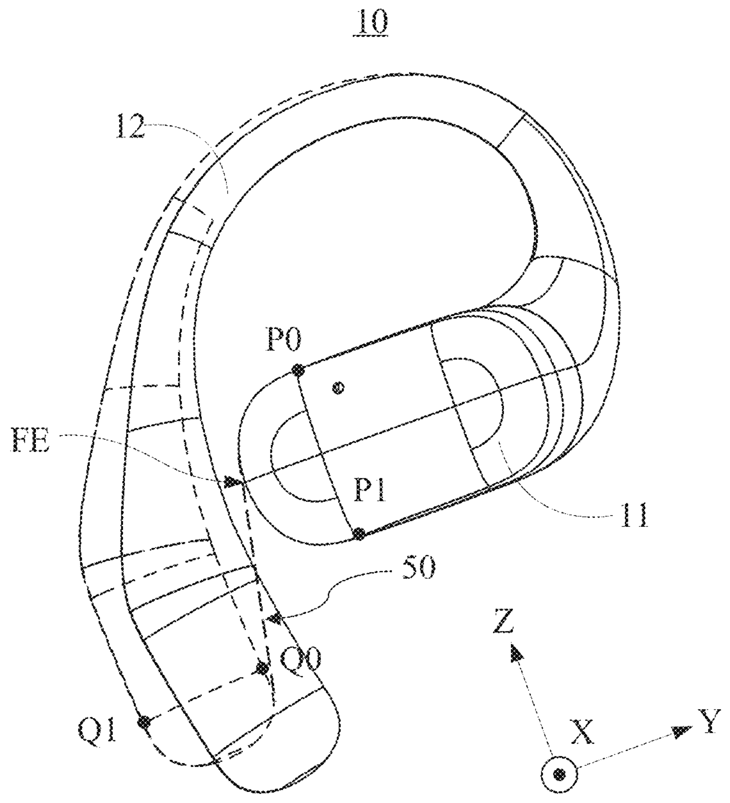
FIG. 10 is a schematic diagram illustrating a morphological difference between morphologies of an open earphone in a wearing state and in a non-wearing state according to some embodiments of the present disclosure.

FIG. 10 is a schematic diagram illustrating a morphological difference between morphologies of an open earphone in a wearing state and in a non-wearing state according to some embodiments of the present disclosure. The dotted line area indicates a first portion of the ear hook in the wearing state, which is farther away from the end FE of the sound production component as compared to the first portion of the ear hook in the non-wearing state. In the wearing state, the open earphone 10 forms a second projection on the sagittal plane of the human body, similar to the first projection illustrated in FIG. 6, and the second projection also includes an outer contour, a first end contour, an inner contour, and a second end contour. The inner contour, the first end contour, the second end contour, and a tangent segment connecting the first end contour and the second end contour jointly define a fourth closed curve. As previously described, the projection shape formed by the projection of the open earphone 10 on the first plane is close to the projection shape formed by the projection of the open earphone 10 on the sagittal plane of the human body, and therefore, contour boundary points such as that of FIG. 6, i.e., point P0, point P1, point Q0, and point Q1, may still be used to describe the delineation of each contour in the second projection. That is to say, the definition of the outer contour, the first end contour, the inner contour, the second end contour, and the tangent segment in the second projection are similar to those of in the first projection, and may not be repeated here.

In some embodiments, in the wearing state of the open earphone 10, the inner contour, the first end contour, the second end contour, and the tangent segment 50 connecting the first end contour and the second end contour jointly define the fourth closed curve. Similar to the third area, in some embodiments, the fourth closed curve jointly defined by the tangent segment 50, the inner contour, the first end contour, and the second end contour has a fourth area. A difference between the fourth closed curve and the third closed curve may reflect the fit degree of the sound production component 11 and the ear hook to the ear when the open earphone 10 is worn.

In some embodiments, due to the elasticity of the ear hook, in the wearing state, the distance between the ear hook and the sound production component 11 is increased so that the fourth area formed by the open earphone 10 in the wearing state is larger than the third area formed by the open earphone 10 in the non-wearing state. In some embodiments, if the fourth area is too large, the sound production component 11 does not abut against the edge of the inferior concha, resulting in the opening of the leakage structure of the cavity-like structure formed by the sound production component 11 and the inferior concha being too large, the sound component directly radiated outward by the sound guiding hole being increased, and sound reaching the listening position being less, which in turn leads to a reduction in the sound production efficiency of the sound production component 11. In addition, if the fourth area is too large, the clamping effect of the ear hook to the sound production component 11 may be reduced, which may lead to unstable wearing. Based on this, the fourth area of the fourth closed curve should not be too large. In some embodiments, taking into account the overall structure of the open earphone 10, and the need for the shape of the ear hook to adapt to the space between the ear and the head, etc., the fourth area of the fourth closed curve does not exceed 900 $mm^2$. In some embodiments, if the fourth area is too small, the distance between the ear hook (e.g., the upper vertex of the ear hook) and the sound production component 11 may be too small or the clamping force between the ear hook and the sound production component 11 on the user's ear may be too strong, which may affect the wearing comfort of the open earphone 10. Based on this, the fourth area of the fourth closed curve should not be too small, and in some embodiments, the fourth area is not less than 350 $mm^2$.

In some embodiments, taking into account the sound generation efficiency of the open earphone 10 and the wearing stability and comfort, the fourth area of the fourth closed curve may be within a range of 350 $mm^2$-900 $mm^2$. In some embodiments, the fourth area of the fourth closed curve may be within a range of 450 $mm^2$-750 $mm^2$ in order to ensure wearing stability of the user while wearing the earphone, as well as to ensure the listening volume of the open earphone 10 at the listening position (e.g., at the ear canal opening) and improve the comfort of the user while wearing the earphone.

If a ratio of the third area to the fourth area is too small, the clamping force on the user's ear may be too small, which in turn leads to unstable wearing. If the ratio of the third area to the fourth area is too large, it may result in poor elasticity in the ear hook, making it inconvenient for the user to wear, and brings foreign body sensation to the ear after wearing. Therefore, in some embodiments, to ensure proper elasticity of the ear hook, the ratio of the third area of the third closed curve to the fourth area of the fourth closed curve is within a range of 0.5-0.85. In some embodiments, to further improve the fit of the sound production component 11 and the ear hook to the ear and to increase the wearing stability of the open earphone, the ratio of the third area to the fourth area is within a range of 0.59-0.77.

The open earphone provided in the embodiments of the present disclosure, by controlling the ratio of the distance h1 between the centroid O of the seventh projection and the highest point of the eighth projection in the vertical axis direction to the height h of the eighth projection in the vertical axis direction to be within the range of 0.35-0.6, it is possible to make at least part of the sound production component 11 extend into the inferior concha and form the acoustic model shown in FIG. 4 with the inferior concha of the user. In addition, by controlling the areas of the closed curves defined by the projections of the open earphone in the wearing state and in the non-wearing state (e.g., the third area of the first projection, the fourth area of the second projection) to be within a suitable range, it is possible to cause the sound production component 11 to abut against the edge of the inferior concha, so that the opening of the leakage structure of the cavity-like structure formed by the sound production component 11 and the inferior concha is small, so as to reduce the sounds radiated outwardly by the sound guiding hole. Therefore, the listening volume of the open earphone at the listening position (e.g., at the ear canal opening), especially at the low and medium frequency, is improved while maintaining a good far-field sound leakage cancellation effect. In addition, when at least part of the sound production component 11 extends into the inferior concha, the inferior concha may support and restrict the sound production component 11 to a certain extent, to improve the stability of the open earphone 10 in the wearing state.

In some embodiments, considering that when the user wears the open earphone 10, if a distance between the centroid O of the seventh projection and a projection of the first portion 121 of the ear hook on the sagittal plane is too large, the fourth area may be too large. In such a case, it may cause unstable wearing (at this time, an effective clamping of the ear may not be formed between the sound production component 11 and the ear hook), and the problem that the sound production component 11 may not effectively extend into the inferior concha (or the opening the leakage structure of the cavity-like structure formed by the sound production component with the inferior concha may be too large), thereby affecting the listening effect. If the distance is too small, the fourth area may be too small. In such a case, it may affect the relative position of the sound production component to the inferior concha of the user and the ear canal opening, and may also cause the sound production component 11 or the ear hook to press the ear, resulting in poor wearing comfort. Accordingly, in order to avoid the problems, in some embodiments, in the wearing state, the distance between the centroid O of the seventh projection and the projection of the first portion 121 of the ear hook on the sagittal plane may be within a range of 18 mm-43 mm. By controlling the distance to be within the range of 18 mm-43 mm, the fourth area may be within a suitable range (e.g., a range of 450 $mm^2$-750 $mm^2$), so that the ear hook may fit the ear of the user better, and the sound production component 11 may be ensured to be just located at the inferior concha of the user, and the acoustic model in FIG. 4 may be formed, thereby ensuring that the sound output by the sound production component 11 may be better transmitted to the user. In some embodiments, in order to make the opening of the leakage structure of the cavity-like structure formed by the sound production component 11 and the inferior concha small, and to reduce the sound radiated directly outwardly from the sound guiding hole to improve the listening effect, in the wearing state, the distance between the centroid O of the seventh projection and the projection of the first portion 121 of the ear hook on the sagittal plane should not be too large, e.g., less than 41 mm. In some embodiments, in order to prevent the sound production component 11 or the ear hook from pressing on the ear, in the wearing state, the distance between the centroid O of the seventh projection and the projection of the first portion 121 of the ear hook on the sagittal plane should not be too small, e.g., greater than 20 mm. In some embodiments, taking into account the listening effect and the wearing stability and comfort of the open earphone 10, the distance between the centroid O of the seventh projection and the projection of the first portion 121 of the ear hook on the sagittal plane may be within a range of 20 mm-41 mm. In some embodiments, in order to further improve the wearing stability of the open earphone and ensure the listening effect of the sound production component 11 at the ear canal opening, the distance between the centroid O of the seventh projection and the projection of the first portion 121 of the ear hook on the sagittal plane may be within a range of 22 mm-40.5 mm. As a specific example, see FIG. 5C, a minimum distance d3 between the centroid O of the seventh projection and the projection of the first portion 121 of the ear hook on the sagittal plane may be 21 mm, and a maximum distance d4 between the centroid O of the seventh projection and the projection of the first portion 121 of the ear hook on the sagittal plane may be 41.2 mm.

In some embodiments, due to the elasticity of the ear hook, the distances between the sound production component 11 and the ear hook in the wearing state and the non-wearing state may vary (usually the distance in the non-wearing state may be smaller than that in the wearing state). For example, in some embodiments, when the open earphone 10 is not worn, a distance between a centroid of a projection of the sound production component 11 on a first plane and a centroid of a projection of the first portion 121 of the ear hook on the first plane may be within a range of 15 mm-38 mm. By controlling the distance to be within the range of 15 mm-38 mm, the third area may be within a suitable range (e.g., a range of 300 $mm^2$-500 $mm^2$), so that the ear hook may fit the ear of the user better, and the sound production component 11 may be just located at the inferior concha of the user, and the acoustic model in FIG. 4 may be formed, thereby ensuring that the sound output by the sound production component 11 may be better transmitted to the user. In some embodiments, in order to make the opening of the leakage structure of the cavity-like structure formed by the sound production component 11 and the inferior concha small, and to reduce the sound radiated directly outwardly from the sound guiding hole to improve the listening effect, in the non-wearing state of the open earphone 10, the distance between the centroid of the projection of the sound production component 11 on the first plane and the centroid of the projection of the first portion 121 of the ear hook on the first plane may not be too large, e.g., less than 36 mm. In some embodiments, in order to prevent the sound production component 11 or the ear hook from pressing on the ear, in the non-wearing state of the open earphone 10, the distance between the centroid of the projection of the sound production component 11 on the first plane and the centroid of the projection of the first portion 121 of the ear hook on the first plane may be not be too small, e.g., larger than 16 mm. In some embodiments, taking into account the listening effect and the wearing stability and comfort of the open earphone 10, in the non-wearing state of the open earphone 10, the distance between the centroid of the projection of the sound production component 11 on the first plane and the centroid of the projection of the first portion 121 of the ear hook on the first plane may be within a range of 16 mm-36 mm. In some embodiments, the distance between the centroid of the projection of the sound production component 11 on the first plane and the centroid of the projection of the first portion 121 of the ear hook on the first plane in the wearing state is set to be slightly smaller than that in the non-wearing state, the ear hook may produce a certain clamping force on the user's ear when the open earphone 100 is in the wearing state, thereby improving the wearing stability without affecting the user's wearing experience.

Figure 11A:
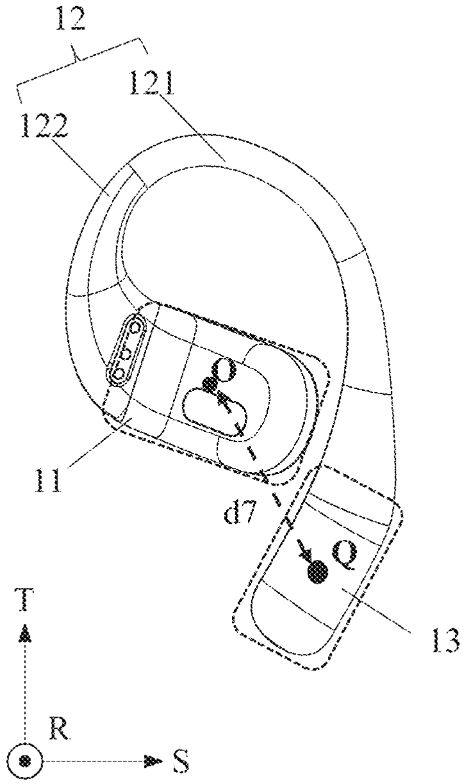
FIG. 11A is a schematic diagram illustrating an exemplary structure of an open earphone according to some embodiments of the present disclosure.
Figure 11B:
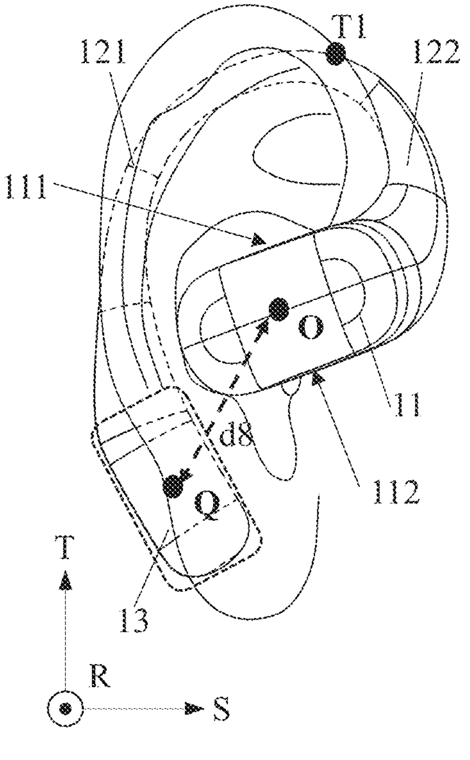
FIG. 11B is a schematic diagram illustrating a user wearing an open earphone according to some embodiments of the present disclosure.

FIG. 11A is a schematic diagram illustrating an exemplary structure of an open earphone according to some embodiments of the present disclosure. FIG. 11B is a schematic diagram illustrating a user wearing an open earphone according to some embodiments of the present disclosure. As shown in FIG. 11A and FIG. 11B, the open earphone 10 may also include a battery compartment 13, the sound production component 11 and the battery compartment 13 may be respectively located at two ends of the suspension structure 12. In some embodiments, an end of the first portion 121 away from the sound production component 11 may be connected to the battery compartment 13, and a battery electrically connected to the sound production component 11 may be arranged in the battery compartment 13. In some embodiments, the ear hook may be an arc structure adapted to a connection part between the auricle and the head. When the user wears the open earphone 10, the sound production component 11 and the battery compartment 13 may be respectively located on the front outer side and the rear inner side of the auricle. The sound production component 11 may extend toward the first portion 121 of the ear hook, and the whole or part of the structure of the sound production component 11 may extend into the inferior concha, and cooperate with the inferior concha to form a cavity-like structure. When a size (length) of the first portion 121 in an extension direction of the first portion 121 is too small, the battery compartment 13 may be near the top of the auricle of the user, then the first portion 121 and the second portion 122 may not provide sufficient contact area to the ear or the head for the open earphone 10, causing the open earphone 10 to fall off easily from the ear. Therefore, a length of the first portion 121 of the ear hook may be long enough to ensure that the ear hook may provide sufficient contact area to the ear or the head, thereby increasing the resistance of open earphone 10 to falling off from the human ear or the head. In addition, when the distance between the end of the sound production component 11 and the first portion 121 of the ear hook is too large, the battery compartment 13 may be away from the auricle in the wearing state, which may not provide sufficient clamping force for the open earphone, and the open earphone may be liable to fall off. When the distance between the end of the sound production component 11 and the first portion 121 of the ear hook is too small, the battery compartment 13 or the sound production component 11 may squeeze the auricle, which may affect the wearing comfort when user wears the open earphone for a long time. Taking the user wearing the open earphone as an example, the length of the first portion 121 of the ear hook in the extension direction and a distance between the end of the sound production component 11 and the first portion 121 may be represented by a distance between the centroid O of the projection (i.e., the seventh projection) of the sound production component 11 on the sagittal plane and the centroid Q of the projection of the battery compartment 13 on the sagittal plane. In order to ensure that the ear hook may provide a large enough contact area to the ear or the head, the distance of the centroid Q of the projection of the battery compartment 13 on the sagittal plane relative to the horizontal plane (e.g., the ground plane) may be smaller than a distance of the centroid O of the projection of the sound production component 11 on the sagittal plane relative to the horizontal plane, i.e., in the wearing state, the centroid Q of the projection of the battery compartment 13 on the sagittal plane may be located below the centroid O of the projection of the sound production component 11 on the sagittal plane. In the wearing state, the part or whole position of the sound production component 11 may extend into the inferior concha, and the position of the sound production component 11 may be relatively fixed. If the distance between the centroid O of the projection of the sound production component 11 on the sagittal plane and the centroid Q of the projection of the battery compartment 13 on the sagittal plane is too small, the battery compartment 13 may be tightly attached to or even press against the rear inner side of the auricle, which may affect the wearing comfort of the user. In addition, if the distance between the centroid O of the projection of the sound production component 11 on the sagittal plane and the centroid Q of the projection of the battery compartment 13 on the sagittal plane is too small, the length of the first portion 121 of the ear hook may be relatively short, causing the fourth area to be small, and affecting the user's wearing comfort. If the distance between the centroid O of the projection of the sound production component 11 on the sagittal plane and the centroid Q of the projection of the battery compartment 13 on the sagittal plane is too large, the length of the first portion 121 of the ear hook may also be relatively long, causing the fourth area to be large and the user to clearly feel that the part of earphone located on the rear inner side of the auricle is heavy or the position of the battery compartment 13 relative to the auricle is far away when wearing the open earphone, the earphone being prone to fall off during exercise of the user, thereby affecting the wearing comfort of the user and the wearing stability of the open earphone. Based on this, in some embodiments, a distance d8 between the centroid O of the projection of the sound production component 11 on the sagittal plane and the centroid Q of the projection of the battery compartment 13 on the sagittal plane may be within a range of 20 mm-30 mm. In some embodiments, in order to prevent the fourth area from being too small and thus affecting the wearing comfort of the user, in the wearing state, the distance d8 between the centroid O of the projection of the sound production component 11 on the sagittal plane and the centroid Q of the projection of the battery compartment 13 on the sagittal plane should not be too small, e.g., greater than 22 mm. In some embodiments, in order to prevent the fourth area from being too large, which may affect the wearing stability of the open earphone 10, in the wearing state, the distance d8 between the centroid O of the projection of the sound production component 11 on the sagittal plane and the centroid Q of the projection of the battery compartment 13 on the sagittal plane should not be too large, for example, less than 28 mm. In some embodiments, in order to enable the user to wear the open earphone 10 with both better stability and comfort, the distance d8 between the centroid O of the projection of the sound production component 11 on the sagittal plane and the centroid Q of the projection of the battery compartment 13 on the sagittal plane may be within a range of 22 mm-28 mm. In some embodiments, in order to provide both stability and comfort to the user while wearing the open earphone 10, the distance d8 between the centroid O of the projection of the sound production component 11 on the sagittal plane and the centroid Q of the projection of the battery compartment 13 on the sagittal plane may be within a range of 23 mm-26 mm.

Due to the elasticity of the ear hook, in the wearing state and the non-wearing state of the open earphone 10, the distances between the centroid O of the projection of the sound production component 11 on the sagittal plane and the centroid Q of the projection of the battery compartment 13 on the sagittal plane may vary. In some embodiments, in the non-wearing state, a distance d7 between a centroid of a projection of the sound production component 11 on the first plane and a centroid of a projection of the battery compartment 13 on the first plane is within a range of 16.7 mm-25 mm. In some embodiments, in order to prevent the third area from being too small and thus affecting the user's wearing comfort, in the non-wearing state, the distance d7 between the centroid of the projection of the sound production component 11 on the first plane and the centroid of the projection of the battery compartment 13 on the first plane should not be too small, e.g., greater than 18 mm. In some embodiments, in order to prevent the third area from being too large and thus affecting the wearing stability of the open earphone 10, in the non-wearing state, the distance d7 between the centroid of the projection of the sound production component 11 on the first plane and the centroid of the projection of the battery compartment 13 on the first plane should not be too large, e.g., less than 23 mm. In some embodiments, in order to take into account the stability and comfort of the open earphone 10 when worn by the user, to prevent the third area from being too large or too small, in the non-wearing state, the distance d7 between the centroid of the projection of the sound production component 11 on the first plane and the centroid of the projection of the battery compartment 13 on the first plane may be within a range of 18 mm-23 mm. In some embodiments, in order to take into account the stability and comfort of the open earphone 10 when worn by the user, to prevent the third area from being too large or too small, in the non-wearing state, the distance d7 between the centroid of the projection of the sound production component 11 on the first plane and the centroid of the projection of the battery compartment 13 on the first plane may be within a range of 19.6 mm-21.8 mm.

In some embodiments, in the wearing state and the non-wearing state of the open earphone 10, distances between a centroid of a projection of the sound production component 11 on a projection plane (e.g., the sagittal plane, the first plane) and a centroid of a projection of the battery compartment 13 on the projection plane may vary. The variation value may reflect a softness of the ear hook. When the softness of the ear hook is too large, the overall structure and shape of the open earphone 10 may be unstable, and may not provide strong support for the sound production component 11 and the battery compartment 13, the wearing stability may also poor, and the open earphone may be liable to fall off. Considering that the ear hook may be hung at the connection part between the auricle and the head, when the softness of the ear hook is too small, the open earphone 10 may not be liable to deform. When the user wears the open earphone, the ear hook may closely fit or even pressure against a region between the ears or the head, affecting wearing comfort. In order to make the user have better stability and comfort when wearing the open earphone 10, in some embodiments, a ratio of the variation value of the distances between the centroid O of the projection of the sound production component 11 on the sagittal plane and the centroid Q of the projection of the battery compartment 13 on the sagittal plane in the wearing state and the non-wearing state of the open earphone 10 to the distance between the centroid of the projection of the sound production component 11 on the first plane and the centroid of the projection of the battery compartment 13 on the first plane in the non-wearing state of the open earphone may be within a range of 0.3-0.8. Preferably, the ratio of the variation value of the distances between the centroid O of the projection of the sound production component 11 on the sagittal plane and the centroid Q of the projection of the battery compartment 13 on the sagittal plane in the wearing state and the non-wearing state of the open earphone 10 to the distance between the centroid of the projection of the sound production component 11 on the first plane and the centroid of the projection of the battery compartment 13 on the first plane in the non-wearing state of the open earphone 10 may be within a range of 0.45-0.68.

It should be noted that, the shape and the centroid Q of the projection of the battery compartment 13 on the sagittal plane may be found in the relevant descriptions on the shape and the centroid O of the projection of the sound production component 11 on the sagittal plane in the present disclosure. In addition, in the present disclosure, the battery compartment 13 and the first portion 121 of the ear hook may be mutually independent structures. The battery compartment 13 and the first portion 121 of the ear hook may be connected in an inserting mode, a clamping mode, etc. The projection of the battery compartment 13 on the sagittal plane may be obtained more accurately by using a splicing point or a splicing line between the battery compartment 13 and the first portion 121 when the projection of the battery compartment 13 is determined. In other embodiments, the battery compartment 13 may also be considered to be part of the first portion 121 of the ear hook, in which case the battery compartment 13 is located at the end of the first portion 121 away from the sound production component 11, and the projection of the first projection and/or the first end contour in the second projection is a projection contour of the free end of the battery compartment on the first plane 60.

In some embodiments, in some embodiments, a weight distribution of the ear hook needs to be considered in order to ensure comfort when wearing the open earphone 10. In order to reduce the pressure on the ear by a pivot point of the ear hook (e.g., the upper vertex), a mass center position of the ear hook (e.g., point F as shown in FIG. 6) may be set near the sound production component 11. In this way, after the sound production component 11 has been extended into the inferior concha, the inferior concha may support part of the weight of both the sound production component 11 and the ear hook, reducing the pressure on the ear by the pivot point of the ear hook. It should be noted that the battery compartment 13 is considered to be a part of the first portion 121 of the ear hook in this embodiment, and the mass center of the ear hook described herein refers to a mass center of the ear hook as a whole (including the battery compartment 13 but excluding the sound production component 11).

Figure 12A:
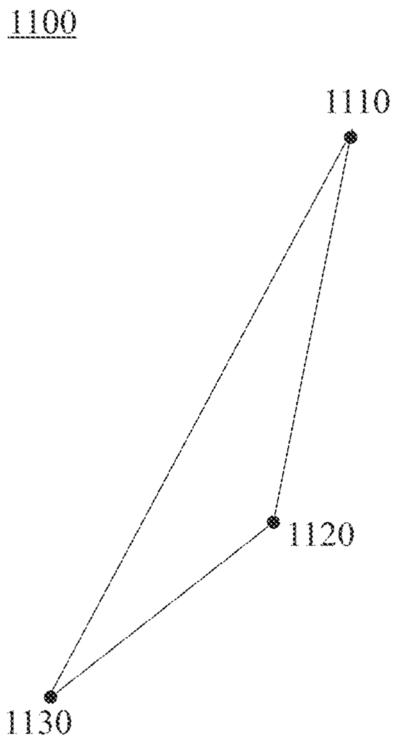
FIG. 12A is a schematic diagram illustrating a triangle formed by mass centers of an ear hook, a battery compartment, and a sound production component of an open earphone according to some embodiments of the present disclosure.

FIG. 12A is a schematic diagram illustrating a triangle formed by a mass center of an ear hook, a battery compartment and a sound production component of an open earphone according to some embodiments of the present disclosure. Referring to FIG. 12A, the three vertices of the triangle 1100 in the figure correspond to the mass center 1110 of the ear hook of the open earphone 10, the mass center 1120 of the sound production component and the mass center 1130 of the battery compartment. The aforementioned triangle 1100 formed by the three mass centers affects the stability and comfort of the open earphone 10 when worn, and in addition, the distribution of the three mass centers also has an impact on the position of the mass center of the open earphone 10. A long line segment in the triangle 1100 may lead to poor stability when wearing the open earphone 10, for example, a distance between the mass center 1130 of the battery compartment and the mass center 1110 of the ear hook is too short, which may lead to a tendency for the open earphone 10 to tilt towards the position of the sound production component 11 when wearing the open earphone 10, with the extension of wearing time or the movement of the user when wearing the open earphone 10, the sound production component 11 may tilt to a certain extent or even fall off, affecting the wearing experience of the user. The distance between the mass center 1130 of the battery compartment and the mass center 1110 of the ear hook is too long, which may lead to a tendency for the open earphone 10 to tilt towards the position of the battery compartment 13 when worn, and with the extension of the wearing time or the movement of the user when wearing the open earphone 10, the sound production component 11 may also produce a certain tilt set or even fall off, affecting the wearing experience of the user. In some embodiments, considering the stability of wearing, in the non-wearing state of the open earphone 10, the distance between the mass center 1130 of the battery compartment 13 and the mass center 1100 of the ear hook is within a range of 40 mm-62 mm. In some embodiments, in order to further improve the comfort of the user wearing the open earphone 10, in the non-wearing state of the open earphone 10, the distance between the mass center 1130 of the battery compartment 13 and the mass center 1100 of the ear hook is within a range of 35 mm-55 mm.

In some embodiments, the distance between the mass center 1120 of the sound production component and the mass center 1130 of the battery compartment 13 is too short, and in order to ensure that the sound production component 11 may extend into the inferior concha in the wearing state so as to form a cavity-like structure between the sound production component 11 and the inferior concha, the length of the first portion 121 of the ear hook may also be relatively short (this is due to the fact that the battery compartment 13 is regarded as a part of the first portion 121 of the ear hook), which may cause the third area to be small, thereby affecting the comfort of the earphone wearing by the user. The distance between the mass center 1120 of the sound production component and the mass center 1130 of the battery compartment 13 is too long, the length of the first portion 121 of the ear hook may also be relatively long, which may affect the wearing comfort, and may also cause the third area to be large, thereby affecting the stability of the open earphone when being worn. In some embodiments, in the non-wearing state, the distance between the mass center 1120 of the sound production component and the mass center 1130 of the battery compartment 13 is within a range of 11 mm-35 mm. In some embodiments, in order to take into account the wearing stability and comfort of the open earphone, in the non-wearing state, the distance between the mass center 1120 of the sound production component and the mass center 1130 of the battery compartment 13 is within a range of 15 mm-30 mm.

In some embodiments, when the user wears the open earphone 10, the ear hook is worn in a relatively fixed position on the ear 100. Therefore, the distance between the mass center 1120 of the sound production component and the mass center 1110 of the ear hook may reflect the position of the sound production component 11 on the ear 100. In some embodiments, in order to enable the sound production component 11 to extend into the inferior concha to form a cavity-like structure between the sound production component 11 and the inferior concha, thereby improving the listening effect, in the non-wearing state of the open earphone 10, the distance between the mass center 1120 of the sound production component and the mass center 1110 of the ear hook is within a range of 15 mm-40 mm. In some embodiments, in order to further improve the comfort of the user wearing the open earphone 10, in the non-wearing state of the open earphone 10, the distance between the mass center 1120 of the sound production component and the mass center 1110 of the ear hook is within a range of 20 mm-35 mm.

Referring to FIG. 6, in some embodiments, in the non-wearing state of the open earphone 10, an outer contour, a first end contour, a second end contour, and a tangent segment 50 connecting the first end contour and the second end contour jointly define a first closed curve. For ease of understanding, similar to the third area, in some embodiments, the tangent segment 50 connecting the first end contour and the second end contour may be determined, and an area of the first closed curve jointly defined by the tangent segment 50, the first end contour, and the second end contour is used as the third area of the first projection. The first closed curve may reflect a region of the auricle that the open earphone 10 can cover in the wearing state, and the way the sound production component 11 and the ear hook contact the ear. A difference between the first area and the third area is equal to the projection area of the open earphone 10 on the first plane (i.e., the sum of the projection area of the sound production component 11 on the first plane and the projection area of the ear hook on the first plane).

In order to allow the whole or part of the structure of the sound production component 11 to extend into the inferior concha to improve the sound production efficiency of the sound production component 11. The position of the sound production component 11B relative to the ear as shown in FIG. 2 makes it possible to set the size of the sound production component 11 smaller to fit the size of the inferior concha. In addition, in order to provide a suitable clamping force between the first portion 121 of the ear hook and the sound production component 11 at an edge of the inferior concha, and to make the open earphone 10 more stable to wear, a distance between the sound production component 11 and the first portion 121 of the ear hook should not be too far apart in the non-wearing state. Thus, by providing a suitable clamping force, the open earphone 10 is not completely supported by an upper edge of the ear alone in the wearing state, thereby enhancing the wearing comfort. Taking the above into account, the first area enclosed by the first closed curve may be set smaller in the non-wearing state. In some embodiments, a range of the first area enclosed by the first closed curve is not greater than 1500 $mm^2$.

In some embodiments, since the ear hook is at least partially set to rest against the ear and/or head in the wearing state, so that a force that presses against the ear is created. The first area is too small and may cause a foreign body sensation when worn by some people (e.g., people with large ears), so that the first area of the first closed curve is in a range of not less than 1000 $mm^2$, considering the wearing manner and the size of the ear. At the same time, in some embodiments, it is considered that the relative position of the sound production component 11 and the user's ear canal (e.g., the inferior concha) affects a count of leakage structures of the cavity-like structure formed by the sound production component 11 and the user's inferior concha, and the size of the opening of the leakage structure directly affects the quality of the listening sound. If the first area is too small, the sound production component 11 may not be able to abut against the edge of the inferior concha, thereby resulting in an excessively large opening of the leakage structure of the cavity-like structure formed by the sound production component 11 with the inferior concha, increased sound radiating directly outwards from the sound production component 11 and less sound reaching the listening position, which in turn leads to a reduction in the sound production efficiency of the sound production component 11. If the first area is too large, the clamping effect of the ear hook to the sound production component 11 may be reduced, which may lead to unstable wearing. In summary, in some embodiments, the first area of the first closed curve may be in a range of 1000 $mm^2$-1500 $mm^2$.

In some embodiments, the range of the first area of the first closed curve is not less than 1150 $mm^2$, considering the overall structure of the open earphone 10 and the need to adapt the shape of the ear hook to the space between the ear and the head, etc. In some embodiments, in order to ensure the sound production efficiency of the sound production component 11 and a suitable clamping force, the range of the first area of the first closed curve is not greater than 1350 $mm^2$. Thus, in some embodiments, the first area of the first closed curve may be in a range of 1150 $mm^2$-1350 $mm^2$ to ensure the sound production efficiency of the sound production component 11 and the comfort of the user wearing the open earphone 10. At the same time, an appropriate first area ensures the listening volume of the open earphone 10 at the listening position (e.g., at the ear canal opening), especially at low and medium frequencies, and to maintain a good far-field sound leakage cancellation.

In order to make it possible for the whole or part of the structure of the sound production component 11 to extend into the inferior concha, for example, the position of the sound production component 11B shown in FIG. 2 relative to the ear and to form the acoustic model shown in FIG. 4 with the user's ear inferior concha, the relative size between the projection area of the sound production component 11 on the first plane 60 and the first area may be set. In some embodiments, in the non-wearing state of the open earphone 10, a ratio between the projection area of the sound production component 11 on the first plane 60 to the first area may be small, to ensure that the sound production component 11 abuts against the edge of the inferior concha, thereby making the opening of the leakage structure of the cavity-like structure formed between the sound production component 11 and the inferior concha smaller, thereby improving the listening effect, and ensuring that the open earphone 10 does not block the user's ear canal opening when wearing the open earphone 10 while reducing the load on the user when wearing the open earphone 10, to facilitate the user's daily wear when accessing ambient sound or daily communication. For example, it is possible to make the projection area of the sound production component 11 on the first plane 60 no more than half of the first area (i.e., a ratio is no more than 0.5). In some embodiments, the ratio of the projection area of the sound production component 11 on the first plane 60 to the first area may be within a range of 0.25-0.4, thereby reducing the wearing sensation of the user.

As previously described, in the wearing state, the open earphone 10 forms a second projection on the sagittal plane of the human body. Similar to the first projection in FIG. 6, the second projection also includes an outer contour, a first end contour, an inner contour, and a second end contour. The outer contour, the first end contour, the second end contour, and a tangent segment connecting the first end contour and the second end contour jointly define a second closed curve. As described above, the shape of the projection formed by the open earphone 10 on the first plane projection is close to the shape of the projection formed by the open earphone 10 in the sagittal projection of the human body, so that in the second projection, the contour boundary points as in FIG. 6, i.e., point P0, point P1, point Q0 and point Q1, may still be used to describe the division of the individual contours in the second projection. That is, the outer contour, the first end contour, the inner contour, and the second end contour and the tangent segment in the second projection are all defined in a similar way to the contours of the first projection and are not repeated here. An area enclosed by the second closed curve is considered to be a second area of the second projection. In some embodiments, the second area may reflect the fit of the open earphone 10 to the user's ear in the wearing state.

Due to the increased distance between the ear hook and the sound production component 11 when the open earphone 10 is worn, the second area enclosed by the second closed curve is larger than the first area enclosed by the first closed curve. In some embodiments, in order to make it possible for the sound production component 11 to reach into the inferior concha in the wearing state and for the ear hook to fit well in the ear, a difference between the second area and the first area may be within a certain range. For example, the second area may be 20 $mm^2$ to 500 $mm^2$ larger than the first area. In some embodiments, the second area may be 50 $mm^2$ to 400 $mm^2$ larger than the first area. In some embodiments, the second area may be 60 $mm^2$ to 100 $mm^2$ larger than the first area.

A too small ratio of the first area to the second area may result in too little clamping force on the user's ear, leading to unstable wear, while a too large ratio of the first area to the second area may result in a less flexible part of the ear hook, making it less user-friendly and causing a foreign body sensation in the ear after wearing. Thus, in some embodiments, a ratio of the first area of the first closed curve to the second area of the second closed curve is in a range of 0.6-1. In some embodiments, in order to ensure that the ear hook has a good elasticity, the ratio of the first area of the first closed curve to the second area of the second closed curve should not be too large, e.g., less than 0.95. In some embodiments, in order to improve the wearing stability, the ratio of the first area of the first closed curve to the second area of the second closed curve should not be too small, e.g., greater than 0.75. In some embodiments, the ratio may be within a range of 0.75-0.95 to balance the elasticity and the wearing stability of the ear hook.

For reasons similar to those of the first area, an appropriate second area ensures that the listening volume of the open earphone 10 at the listening position (e.g., at the ear canal opening), particularly at low and medium frequencies, is maintained while maintaining a good far-field sound leakage cancellation. In some embodiments, the second area is within a range of 1100 $mm^2$-1700 $mm^2$. In some embodiments, the second area is within a range of 1100 $mm^2$-1700 $mm^2$. In some embodiments, the second area should not be too small, e.g., greater than 1300 $mm^2$, to ensure the sound production efficiency of the sound production component 11. In some embodiments, to ensure the stability of the user wearing the open earphone 10, the second area should not be too large, e.g., less than 1650 $mm^2$. In some embodiments, the second area may be within a range of 1300 $mm^2$-1650 $mm^2$ to balance the efficiency of sound generation of the sound production component 11 in the inferior concha and the comfort and stability of the user wearing the open earphone 10.

Since in the wearing state the sound production component 11 fits into the inferior concha, a too large size of the sound production component 11 may block the ear (e.g., the ear canal opening), while a too small size of the sound production component 11 may lead to increased difficulty in arranging the internal structure of the sound production component 11 (e.g., magnetic circuit, circuit board, etc.). Based on this, in some embodiments, in the wearing state of the open earphone 10, a ratio of a projection area of the sound production component 11 on the sagittal plane of the human body to the second area of the open earphone 10 is within a range of 0.15-0.45. In some embodiments, in order to prevent the sound production component 11 from having a too large size to block to the ear, in the wearable state, the ratio of the projection area of the sound production component 11 on the sagittal plane of the human body to the second area should not be too large, e.g., smaller than 0.35. In some embodiments, in order to reduce difficulty in arranging the internal structure of the sound production component 11, in the wearing state, the ratio of the projection area of the sound production component 11 on the sagittal plane of the human body to the second area should not be too small, e.g., greater than 0.2. In some embodiments, in order to ensure that the open earphone 10 does not block the user's ear canal opening when the user is wearing the open earphone 10, and also to reduce the load on the user, to facilitate the user's daily wear while accessing ambient sound or daily communication. The ratio of the projection area of the sound production component 11 on the sagittal plane of the human body to the second area is within a range of 0.2-0.35.

Figure 5D:
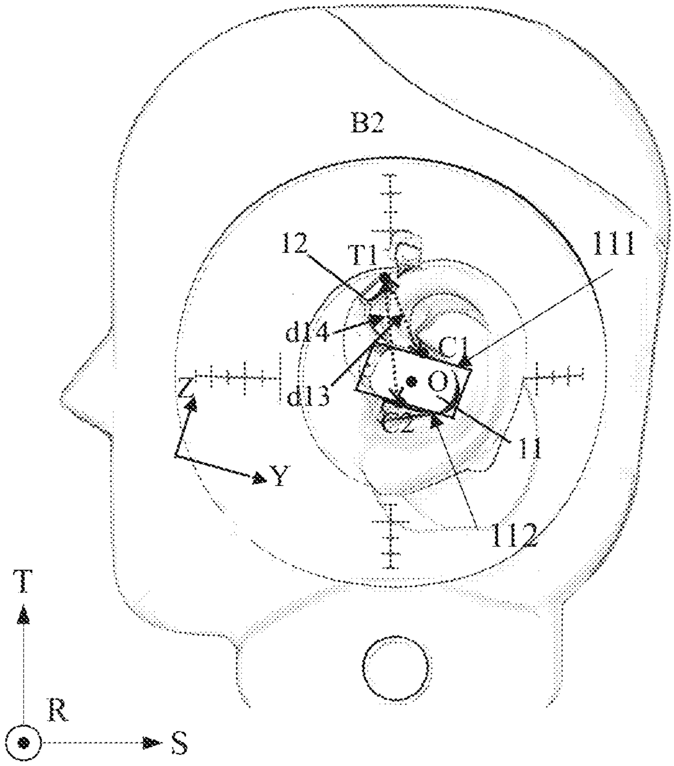
FIG. 5D is a schematic diagram illustrating an exemplary wearing of an open earphone according to some embodiments of the present disclosure.

In some embodiments, see FIG. 5D, a distance from a midpoint of a projection of the upper sidewall 111 of the sound production component 11 on the sagittal plane to the projection of the upper vertex of the ear hook on the sagittal plane and a distance from a midpoint of a projection of the lower sidewall 112 of the sound production component 11 on the sagittal plane to the projection of the upper vertex of the ear hook on the sagittal plane may reflect the size of the sound production component 11 along the short-axis direction Z (the direction indicated by the arrow Z in FIG. 3). The upper vertex of the ear hook may be a position on the ear hook that has the largest distance relative to a specific point on the neck of the user in the vertical axis direction when the user wears the open earphone, e.g., the upper vertex T1 in FIG. 5D. In order to improve the listening effect of the open earphone 10 while ensuring that the open earphone 10 does not block the ear canal opening of the user, in some embodiments, a distance d13 between the midpoint C1 of the projection of the upper sidewall 111 of the sound production component 11 on the sagittal plane and the projection of the upper vertex T1 of the ear hook on the sagittal plane may be within a range of 17 mm-36 mm, and a distance d14 between the midpoint C2 of the projection of the lower sidewall 112 of the sound production component 11 on the sagittal plane and the projection of the upper vertex of the ear hook on the sagittal plane may be within a range of 28 mm-52 mm. In some embodiments, the distance between the midpoint of the projection of the upper sidewall 111 of the sound production component 11 on the sagittal plane and the projection of the upper vertex of the ear hook on the sagittal plane and the distance between the midpoint of the projection of the lower sidewall 112 of the sound production component 11 on the sagittal plane and the projection of the upper vertex of the ear hook on the sagittal plane may also reflect the size of the fourth area. Specifically, the distance between the midpoint of the projection of the upper sidewall 111 of the sound production component 11 on the sagittal plane and the projection of the upper vertex of the ear hook on the sagittal plane is relatively small or the distance between the midpoint of the projection of the lower sidewall 112 of the sound production component 11 on the sagittal plane and the projection of the upper vertex of the ear hook on the sagittal plane is relatively small, and the fourth area is relatively small. The distance between the midpoint of the projection of the upper sidewall 111 of the sound production component 11 on the sagittal plane and the projection of the upper vertex of the ear hook on the sagittal plane is relatively large or the distance between the midpoint of the projection of the lower sidewall 112 of the sound production component 11 on the sagittal plane and the projection of the upper vertex of the ear hook on the sagittal plane is relatively large, and the fourth area is relatively large. In order to ensure that the sound production component 11 may extend into the inferior concha and form a cavity-like structure with the inferior concha in the wearing state, to ensure that the fourth area is within a suitable range to improve the sound production efficiency of the sound production component 11, in some embodiments, the distance d13 between the midpoint C1 of the projection of the upper sidewall 111 of the sound production component 11 on the sagittal plane and the projection of the upper vertex T1 of the ear hook on the sagittal plane may be within a range of 21 mm-32 mm, and the distance d14 between the midpoint C2 of the projection of the lower sidewall 112 of the sound production component 11 on the sagittal plane and the projection of the upper vertex T1 of the ear hook on the sagittal plane may be within a range of 32 mm-48 mm. In some embodiments, in order to further improve the wearing stability and comfort when the open earphone is in the wearing state, the distance d13 between the midpoint C1 of the projection of the upper sidewall 111 of the sound production component 11 on the sagittal plane and the projection of the upper vertex T1 of the ear hook on the sagittal plane may be within a range of 24 mm-30 mm, and the distance d14 between the midpoint C2 of the projection of the lower sidewall 112 of the sound production component 11 on the sagittal plane and the projection of the upper vertex T1 of the ear hook on the sagittal plane may be within a range of 35 mm-45 mm.

Figure 12B:
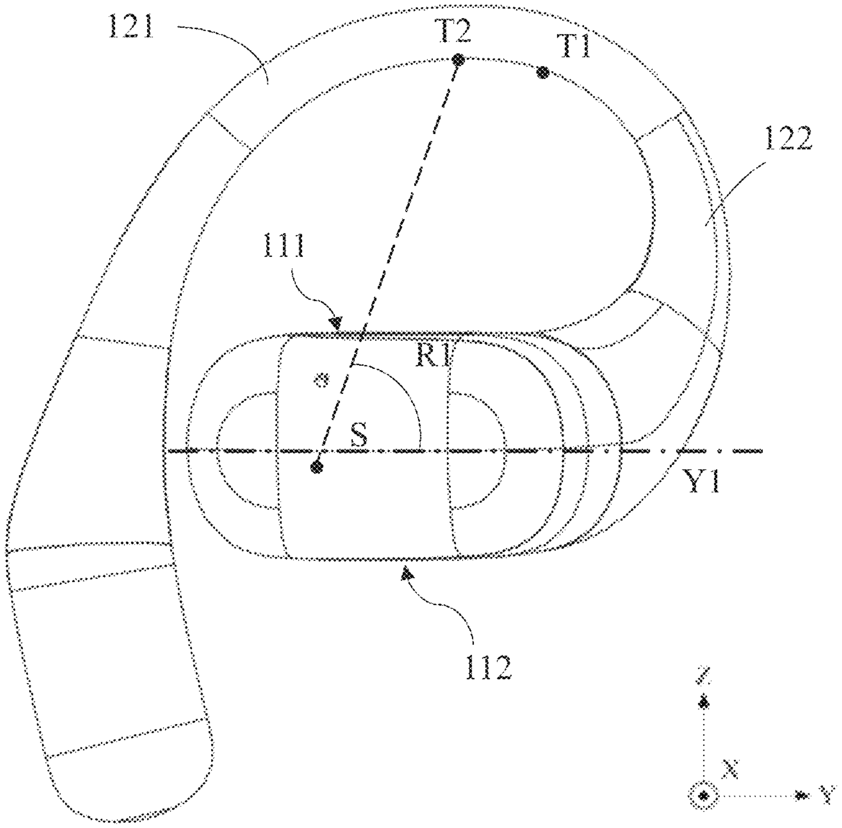
FIG. 12B is a schematic diagram illustrating another exemplary structure of an open earphone according to some embodiments of the present disclosure.

In some embodiments, the mass center position of the open earphone 10 is also of greater relevance to the wearing stability of the open earphone 10. FIG. 12B is a schematic diagram illustrating another exemplary structure of an open earphone according to some embodiments of the present disclosure. In some embodiments, an angle R1 between a line connecting the projection (i.e., the position S) of the mass center of the open earphone 10 on the sagittal plane and a polar point T2 of the ear hook and a long axis Y1 of the portion of the first projection corresponding to the sound production component determines to some extent the morphology of the inner contour of the open earphone 10, which is related to the user wearing feeling. Specifically, in order to ensure the fit of the ear hook to the user's ear or head when the open earphone 10 is worn, the angle is too large or too small, which may lead to a change in the morphology when worn, affecting the fit and may not form the cavity-like structure shown in FIG. 4, affecting the sound production efficiency of the sound production component 11. Therefore, in some embodiments, the angle R1 between the line connecting the projection of the mass center position of the open earphone 10 on the sagittal plane (i.e., the position S) and the polar point T2 of the ear hook and the long axis Y1 of the portion of the first projection corresponding to the sound production component is within a range of 50°-90°. In some embodiments, in order to prevent the angle from being too large to cause instability in wearing, the angle R1 may be within a range of 50°-85°. In some embodiments, in order to prevent the angle from being too small to fail to form the cavity-like structure, the angle R1 may be within a range of 55°-90°. In some embodiments, in order to ensure that the open earphone 10 fits the ear or head and forms the cavity-like structure, the angle R1 may be within a range of 55°-85°. In some embodiments, the polar point of the ear hook may be determined by the following operations. An inner contour of a projection curve of the open earphone 10 on the sagittal plane of the human body in the wearing state (or the inner contour of the projection of the open earphone 10 on the first plane in the non-wearing state) is obtained and a polar point of the inner contour in the short-axis direction Z (e.g., a maximum point) is designated as the polar point of the ear hook. The polar point of the inner contour in the short-axis direction Z may be determined by constructing a coordinate system with the long-axis direction Y of the sound production component as the horizontal axis and the short-axis direction Z as the longitudinal axis, and using a maximum point (e.g., with a first-order derivative of 0) of the inner contour of the projection curve on the coordinate system as the polar point of the inner contour of the projection curve in the short-axis direction Z. In some embodiments, the mass center of the open earphone may be determined by the following operations. A line is attached to a position (e.g., point A) on the open earphone and the open earphone is caused to be in a suspended state, and after the open earphone is suspended and stationary, g the open earphone is scanned using a three-dimensional scanner to obtain a state model of the open earphone (denoted as an state model A); similarly, a line is attached to another position (e.g., point B) on the open earphone and the open earphone is caused to be in the suspended state, and the open earphone is scanned using the three-dimensional scanner to obtain another state model of the open earphone (denoted as the state model B). The state model A and the state model B are imported into a three-dimensional model processing software (keep the three-dimensional coordinate system of the two models consistent during the importing process), and a space line LA along the vertical axis (a direction of the vertical axis corresponds to the vertical direction in the suspended state) and passing through the point A in the state model A is made, and a space line LB along the vertical axis and passing through the point B in the state model B is made. It may be understood that both the space line LA and the space line LB are the lines where the mass center of the open earphone is located. Thus, when the state model A and the state model B are overlapped by using the three-dimensional model processing software, the overlapped position of the space line LA and the space line LB is the mass center of the open earphone. It should be noted that to improve the accuracy of determining the mass center of the open earphone, in other embodiments, more positions on the open earphone may be selected for suspension testing to obtain more (e.g., 3) state models, and a plurality of state models may be overlapped to obtain the mass center of the open earphone.

Figure 12C:
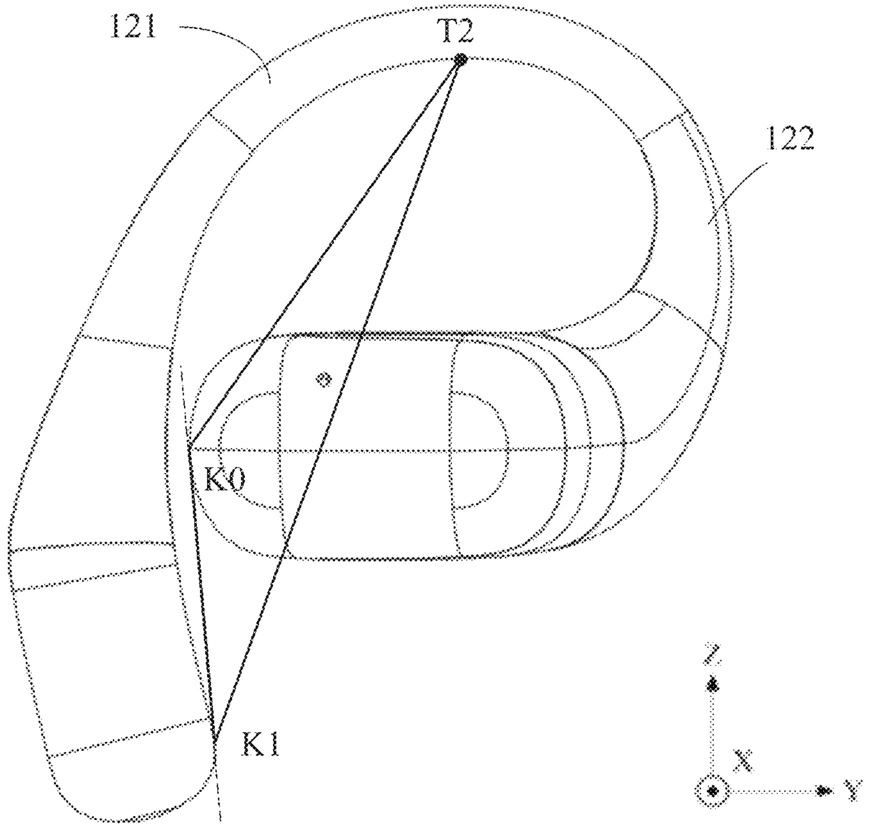
FIG. 12C is a schematic diagram illustrating a tangent segment of a first projection according to some embodiments of the present disclosure.

FIG. 12C is a schematic diagram illustrating a tangent segment of a first projection according to some embodiments of the present disclosure. Referring to FIG. 12 C, the tangent segment 50 of the first closed curve is defined jointly with the first projection, tangent to the first end contour at a first tangent point K0 and tangent to the second end contour at a second tangent point K1, respectively. Since the position of the first tangent point K0 and the second tangent point K1 is related to the first area of the first closed curve, a change in the area of the triangle formed by the line between the first tangent point K0, the second tangent point K1 and the polar point of the projection of the ear hook on the first plane (e.g. point T2) may lead to a change in the first area, e.g. an increase in the area of the triangle corresponds to a decrease in the first area, which in turn affects the user's wearing experience.

In some embodiments, considering the wearing sensation of the user and the practical range of the first area of the first closed curve, the area of the triangle formed by the first tangent point K0, the second tangent point K1, and the polar point of the projection of the ear hook on the first plane in the open earphone 10 in the non-wearing state is in a range of 110 $mm^2$-230 $mm^2$. In some embodiments, the area of the triangle formed by the first tangent point K0, the second tangent point K1, and the polar point projected by the ear hook on the first plane is in a range of 150 $mm^2$-190 $mm^2$, so that the first area of the first closed curve is in a range of 1150 $mm^2$-1350 $mm^2$.

It should be noted that one end of the sound production component 11 of the embodiments of the present disclosure is connected to the second portion 122 of the suspension structure 12. The end of the sound production component 11 may be referred to as a fixed end. An end of the sound production component 11 back from the fixed end may be referred to as a free end or an extremity. The free end of the sound production component 11 is directed toward the first portion 121 of the ear hook. In the wearing state, the suspension structure 12 (e.g., an ear hook) has a vertex (e.g., the vertex T1 illustrated in FIG. 5D), i.e., a location with the highest distance relative to the horizontal plane, which is near the connection part between the first portion 121 and the second portion 122. An upper sidewall is a sidewall (e.g., upper sidewall 111 shown in FIG. 5D) of the sound production component 11, other than the fixed end and the free end, with a center (e.g., a geometrical center) having the smallest distance from the upper vertex of the ear hook in the vertical axis direction. Correspondingly, the lower sidewall is a sidewall opposite to the upper sidewall of the sound production component 11, i.e., a sidewall (e.g., the lower sidewall 112 illustrated in FIG. 5D) of the sound production component 11, other than the fixed end and the free end, with the center point (e.g., the geometric center point) having the greatest distance from the upper vertex of the ear hook in the vertical axis direction.

Figure 13:
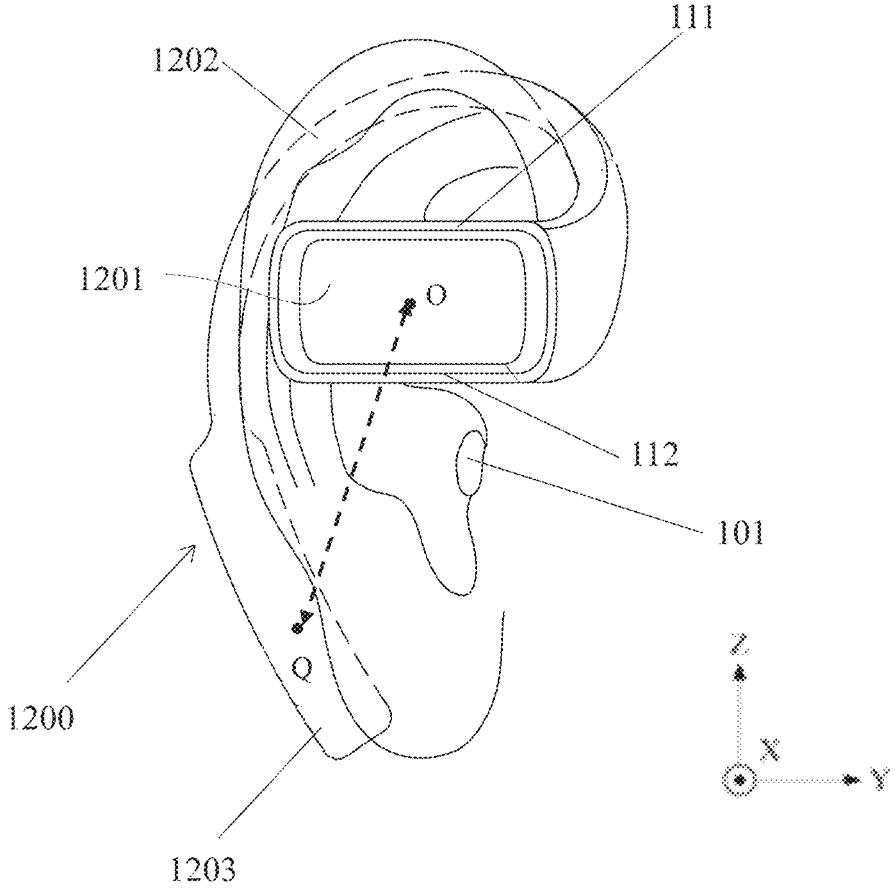
FIG. 13 is a schematic diagram illustrating an exemplary wearing of an open earphone according to some other embodiments of the present disclosure.

In some embodiments, as previously described, the sound production component may have alternative ways of being worn that differ from extending into the inferior concha. The open earphone 1200 shown in FIG. 13 is described in detail below as an example of the open earphone 1200. It should be known that the structure of the open earphone 10 of FIG. 13 and its corresponding parameters may also be equally applicable to the open earphone 10 mentioned above in which the sound production component is extended into the inferior concha, without violating the corresponding acoustic principles.

Figure 14:
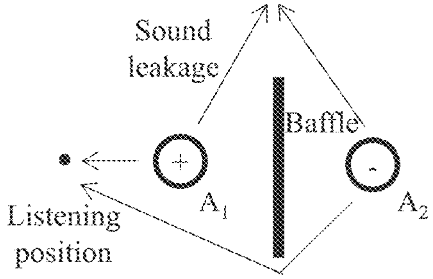
FIG. 14 is a schematic diagram illustrating an acoustic model formed by an open earphone according to some other embodiments of the present disclosure.

By locating the sound production component 1201 at least partially at the user's antihelix 105, the output of the open earphone 1200 may be increased, i.e., the sound intensity in the near-field listening position is increased while the volume of the far-field leakage is reduced. When the user is wearing the open earphone 1200, one or more sound guiding holes may be provided on the side of the housing of the sound production component 1201 near or towards the user's ear canal, and one or more pressure relief holes are provided on other side walls of the housing of the sound production component 1201 (e.g., the side walls away from or behind the user's ear canal), with the sound guiding holes acoustically coupled to the front cavity of the open earphone 1200 and the pressure relief holes acoustically coupled to the rear cavity of the open earphone 1200. Taking the example of the sound production component 1201 including a sound guiding hole and a pressure relief hole, a sound output from the sound guiding hole and a sound output from the pressure relief hole may be approximated as two sound sources, which are equal in size and opposite in phase. The sound emitted from the sound guiding hole may be transmitted unimpeded directly to the user's ear canal opening, whereas the sound emitted from the pressure relief hole needs to bypass the housing of the sound production component 1201 or pass through the sound production component 1201 to form an acoustic model similar to that shown in FIG. 14. As shown in FIG. 14, when there is a baffle between point sound source A1 and point sound source A2, in the near field, a sound field of point sound source A2 needs to go around the baffle in order to interfere with a sound wave of point sound source A1 at the listening position, which corresponds to an increase in the sound range from point sound source A2 to the listening position. Assuming that the point sound source A1 and the point sound source A2 have the same amplitude, an amplitude difference between the sound waves of the point sound source A1 and that of the point sound source A2 at the hearing position may be larger than that in a case without a baffle, thereby reducing a sound cancellation of the two sounds at the hearing position, and increasing a sound volume at the hearing position. In the far-field, the sound waves generated by the point sound source A1 and the point sound source A2 may not bypass the baffle in a relatively large space, and the sound waves may be interfered (as a case without the baffle). Compared to the case without the baffle, the sound leakage in the far-field may not increase significantly. Therefore, a baffle structure around one of point sound source A1 and point sound source A2 may significantly increase the volume at the near-field listening position without significantly increasing the volume of sound leakage in the far field.

Figure 15A:
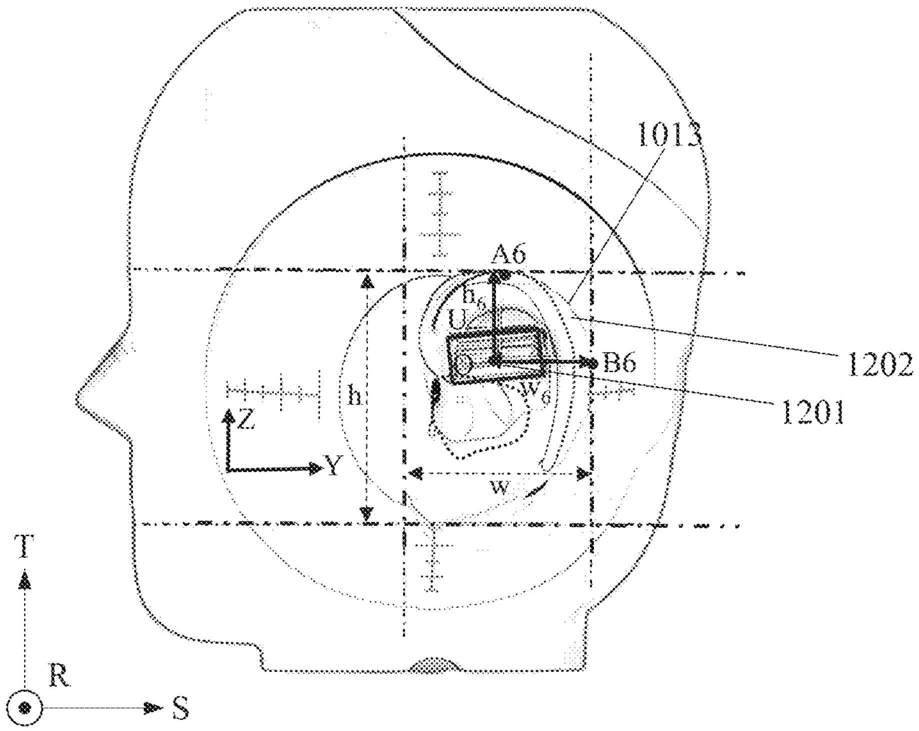
FIG. 15A is a schematic diagram illustrating an exemplary wearing of an open earphone according to other embodiments of the present disclosure.
Figure 15B:
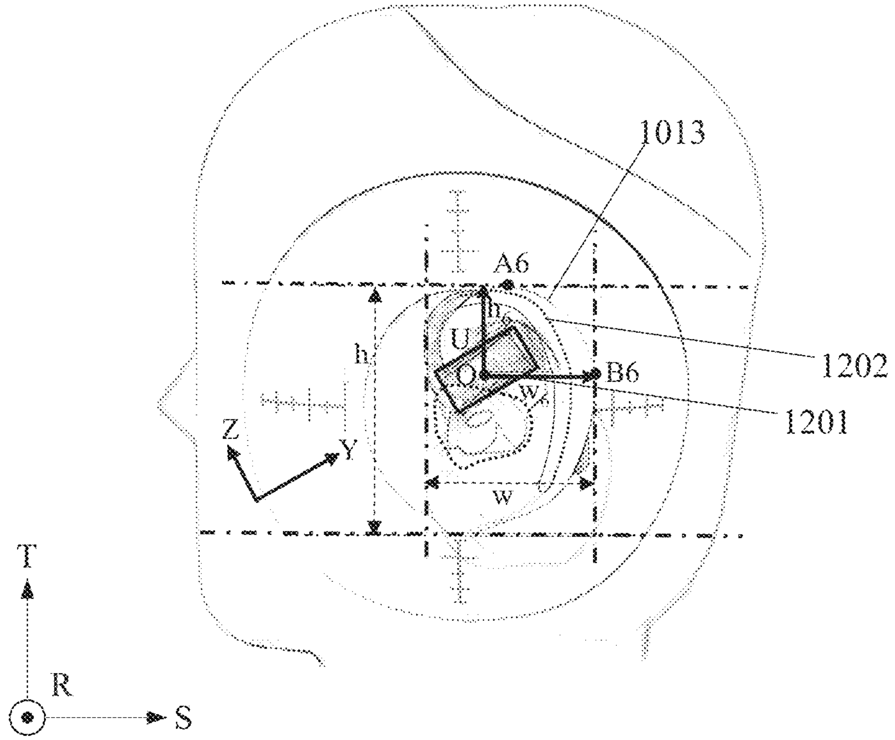
FIG. 15B is a schematic diagram illustrating an exemplary wearing of an open earphone according to other embodiments of the present disclosure.

In some embodiments, when the open earphone 1200 is in the wearing state, the sound production component 1201 and the auricle of the user have a seventh projection (a rectangular region defined by a solid line box U in FIG. 15A and FIG. 15B may be approximately equivalent to the seventh projection) and an eighth projection on the sagittal plane (e.g., an S-T plane in FIG. 15A and FIG. 15B) of the head of the user, respectively. In order to make the whole or part structure of the sound production component 1201 cover the antihelix region of the user (e.g., the position of the antihelix, the triangular fossa, the upper antihelix crus, or the lower antihelix crus), a ratio of a distance h6 between the centroid O of the seventh projection and a highest point A6 of the eighth projection in the vertical axis direction (e.g., a T-axis direction in FIG. 15A and FIG. 15B) to a height h of the eighth projection in the vertical axis direction may be within a range of 0.25-0.4.

Considering that the sidewall of the sound production component 1201 may abut against the antihelix region, in order to make the sound production component 1201 abut against a larger antihelix region, the concave-convex structure of the region may also act as a baffle, to increase the sound path of the sound emitted from the pressure relief hole to the external ear canal 101, thereby increasing the sound path difference between the sound guiding hole and the pressure relief hole to the external ear canal 101, increasing the sound intensity at the external ear canal 101, and reducing the volume of the far-field leakage sound. Accordingly, in order to balance the listening volume and the sound leakage volume of the sound production component 1201 to ensure the acoustic output quality of the sound production component 1201, the sound production component 1201 may be fit as closely as possible to the antihelix region of the user. Correspondingly, the ratio of the distance h6 between the centroid O of the seventh projection of the sound production component on the sagittal plane of the head of the user and the highest point A6 of the eighth projection of the auricle of the user on the sagittal plane in the vertical axis direction to the height h of the eighth projection in the vertical axis direction may be controlled to be within a range of 0.25-0.4. Meanwhile, the ratio of the distance w6 between the centroid O of the seventh projection of the sound production component 1201 on the sagittal plane and the end point B6 of the eighth projection of the auricle of the user on the sagittal plane to the width w of the eighth projection in the sagittal axis direction may be controlled to be within a range of 0.4-0.6. Preferably, in some embodiments, in order to improve the wearing comfort of the open earphone while ensuring the acoustic output quality of the sound production component 1201, the ratio of the distance h6 between the centroid O of the seventh projection and the highest point A6 of the eighth projection in the vertical axis direction to the height h of the eighth projection in the vertical axis direction may be within a range of 0.25-0.35, and the ratio of the distance w6 between the centroid O of the seventh projection and the end point B6 of the eighth projection in the sagittal axis direction to the width w of the eighth projection in the sagittal axis direction may be within a range of 0.42-0.6. More preferably, the ratio of the distance h6 between the centroid O of the seventh projection and the highest point A6 of the eighth projection in the vertical axis direction to the height h of the eighth projection in the vertical axis direction may be within a range of 0.25-0.34, and the ratio of the distance w6 between the centroid O of the seventh projection and the end point B6 of the eighth projection in the sagittal axis direction to the width w of the eighth projection in the sagittal axis direction may be within a range of 0.42-0.55.

Similarly, when the shapes and the sizes of the ears of users are different, the ratio may fluctuate within a certain range. For example, when the earlobe of the user is long, the height h of the eighth projection in the vertical axis direction is larger than that of the general situation. At this time, when the user wears the open earphone 1200, the ratio of the distance h6 between the centroid O of the seventh projection and the highest point A6 of the eighth projection in the vertical axis direction to the height h of the eighth projection in the vertical axis direction may be smaller, e.g., which may be within a range of 0.2-0.35. Similarly, in some embodiments, when the helix of the user is bent forward, the width w of the eighth projection in the sagittal axis direction may be smaller than that of the general situation, and the distance w6 between the centroid O of the seventh projection and the end point B6 of the eighth projection in the sagittal axis direction may also be smaller. At this time, the ratio of the distance w6 between the centroid O of the seventh projection and the end point B6 of the eighth projection in the sagittal axis direction to the width w of the eighth projection in the sagittal axis direction may be larger, e.g., which may be within a range of 0.4-0.7.

In some embodiments, the listening volume of the sound production component 1201, the sound leakage reduction effect, and the wearing comfort and stability may also be improved by adjusting the distance between the centroid O of the seventh projection and the contour of the eighth projection. For example, when the sound production component 1201 is located at the top of the auricle, the earlobe, the facial region on the front side of the auricle, or between the inner contour of the auricle and the edge of the inferior concha, it may be specifically embodied as that the distance between the centroid O of the seventh projection and a point of a certain region of the edge of the eighth projection may be too small, the distance between the centroid O of the seventh projection and a point of another region of the edge of the eighth projection may too large, and the antihelix region may not cooperate with the sound production component 1201 to act as the baffle, affecting the acoustic output effect of the open earphone. In addition, if the distance between the centroid O of the seventh projection and the point of the certain region of the edge of the eighth projection is too large, a gap may be formed between the end FE of the sound production component 1201 and the inner contour 1014 of the auricle, and the sound emitted from the sound guiding hole and the sound emitted from the pressure relief hole may produce an acoustic short circuit in a region between the end FE of the sound production component 1201 and the inner contour 1014 of the auricle, resulting in a decrease in the listening volume at the opening of the ear canal of the user. The larger the region between the end FE of the sound production component 1201 and the inner contour 1014 of the auricle, the more obvious the acoustic short circuit. In some embodiments, when the wearing state of the open earphone 10 is that at least part of the sound production component 1201 covers the antihelix region of the user, the centroid O of the seventh projection of the sound production component 1201 on the sagittal plane of the head of the user may also be located in a region enclosed by the contour of the eighth projection, but compared with at least part of the sound production component 1201 extending into the inferior concha of the user, in the wearing state, the distance between the centroid O of the seventh projection of the sound production component 1201 on the sagittal plane of the head of the user and the contour of the eighth projection may be different. In the open earphones 1200, at least part of the structure of the sound production component 1201 may cover the antihelix region, which may fully expose the opening of the ear canal, and make the user better receive sounds from the external environment. In some embodiments, in order to consider the listening volume of the sound production component 1201, the sound leakage reduction effect, the effect of receiving the sound of the external environment, and reducing the region between the end FE of the sound production component 1201 and the inner contour 1014 of the auricle as much as possible in the wearing manner, to make the sound production component 1201 have better acoustic output quality, the distance between the centroid O of the seventh projection and the contour of the eighth projection may be within a range of 13 mm-54 mm. Preferably, the distance between the centroid O of the seventh projection and the contour of the eighth projection may be within a range of 18 mm-50 mm. More preferably, the distance between the centroid O of the seventh projection and the contour of the eighth projection may be within a range of 20 mm-45 mm. In some embodiments, by controlling the distance between the centroid O of the seventh projection of the sound production component 1201 on the sagittal plane of the head of the user and the contour of the eighth projection to be within a range of 23 mm-40 mm, the sound production component 1201 may be roughly located in the antihelix region of the user, and at least part of the sound production component 1201 may form the baffle with the antihelix region, to increase the sound path of the sound emitted from the pressure relief hole to the external ear canal 101, thereby increasing the sound path difference from the sound guiding hole and the pressure relief hole to the external ear canal 101, increasing the sound intensity at the external ear canal 101, and reducing the volume of far-field sound leakage.

Figure 16:
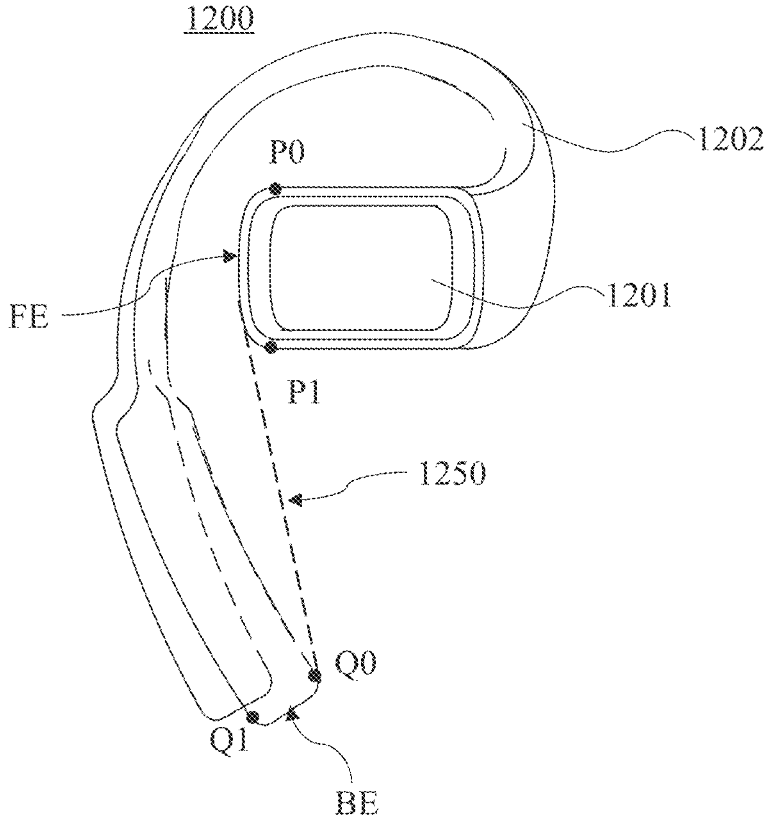
FIG. 16 is a schematic diagram illustrating a morphological difference between morphologies of an open earphone in a wearing state and in a non-wearing state according to some embodiments of the present disclosure.

FIG. 16 is a schematic diagram illustrating a morphological difference between morphologies of an open earphone in a wearing state and in a non-wearing state according to some embodiments of the present disclosure. The dotted line area indicates a first portion of the ear hook in the wearing state that is farther away from the free end of the sound production component as compared to the first portion of the ear hook in the non-wearing state. As shown in FIG. 16, in the non-wearing state, the open earphone 1200 forms a fifth projection on the first plane, the fifth projection including an outer contour, a first end contour, an inner contour, and a second end contour. Similar to the open earphone 10 structure in FIG. 3, the first end contour in the fifth projection may be a projection contour of the end FE of the sound production component 1201 on the first plane, with two endpoints P0 and P1 of the first end contour being the projection points of the end FE at the junction with the rest of the sound production component 1201 on the first plane. The second end contour may be a projection contour of the free end BE of the suspension structure 1202 on the first plane, with the two end points Q0 and Q1 of the second end contour being the projection points of the free end BE at the junction with the rest of the suspension structure 1202 on the first plane. The outer contour may be a contour where the fifth projection lies between the point P1 and the point Q1. The inner contour may be a contour where the fifth projection lies between the points P0 and Q0. For more information about the division of the end FE and the free end BE of the suspension structure 1202, please refer to the relevant description of the open earphone 10 (as described in relation to FIG. 3 and FIG. 6 of the present disclosure).

Taking the projection of the sound production component 1201 on the first plane as a rectangle-like (e.g., runway-shaped), there are parallel or approximately parallel upper and lower side wall projections in the projection of the sound production component 1201, and the first end contour connecting the upper and lower side wall projections, the first end contour may be a straight line segment or a circular arc, with points P0 and P1 indicating the two ends of the first end contour respectively. By way of example only, the point P0 may be a junction point between an arc formed by the projection of the free end of the sound production component 1201 and a line segment of the upper side wall projection, and similarly to the point P0, the point P1 may be a junction point between an arc formed by the projection of the free end of the sound production component 1201 and a line segment of the lower side wall projection. Similarly, the ear hook has a free end at one end away from the sound production component 1201, and the projection of the free end of the ear hook on the first plane 60 forms a second end contour, which may be a straight line segment or an arc. The points Q0 and Q1 indicate the two ends of the second end contour respectively. In some embodiments, the points Q0 and Q1 may be two endpoints of a line segment or arc of the projection of the free end of the first portion of the ear hook in the direction away from the second portion of the ear hook on the first plane 60, and further, the end point close to the sound production component 1201 in the long-axis direction Y of the sound production component 1201 is point Q0 and the end point away from the sound production component 1201 is Q1.

As shown in FIG. 16, the projection shape of the open earphone 1200 on the first plane and on the sagittal plane of the human body may reflect the manner in which the open earphone 1200 is worn in the ear. For example, the area of the fifth projection may reflect an area of the ear that may be covered by the open earphone 1200 in the wearing state, and the way in which the sound production component 1201 and the ear hook are in contact with the ear. In some embodiments, the inner contour, the outer contour, the first end contour, and the second end contour in the fifth projection form a non-enclosed region because the sound production component 1201 is not in contact with the first portion of the ear hook. The size of this region is closely related to the wearing effect of the open earphone 1200 (e.g., stability of wearing, sound production position, etc.). For ease of understanding, in some embodiments, a tangent segment 1250 connecting the first end contour and the second end contour may be determined, and the area enclosed by the fifth closed curve jointly defined by the tangent segment 1250, the outer contour, the first end contour, and the second end contour is the area of the fifth projection (also referred to as the "fifth area").

In some embodiments, the open earphone 1200 differs from the open earphone 10 shown in FIG. 5 in that the sound production component 1201 of the open earphone 1200 is located at the user's antihelix 105 in the wearing state, so that the fifth area is smaller than the first area. In some embodiments, the fifth area may be 0.2 times to 0.6 times the first area. In some embodiments, the fifth area may be 0.3 times to 0.5 times the first area. In some embodiments, the fifth area of the fifth closed curve may be within a range of 250 $mm^2$-1000 $mm^2$. In some embodiments, the ratio of the distance h6 between the centroid O of the seventh projection and the highest point A6 of the eighth projection in the vertical axis direction to the height h of the eighth projection in the vertical axis direction is within a range of 0.25-0.4, which makes that at least part of the sound production component 1201 covers the antihelix region. In order to further increase the area of the region of the sound production component 1201 abutting against the antihelix region to cause the concave-convex structure of the region to act as a baffle, to increase the sound path of the sound emitted from the pressure relief hole to the external ear canal 101, thereby increasing the sound path difference between the sound guiding hole and the pressure relief hole to the external ear canal 101, increasing the sound intensity at the external ear canal 101, and reducing the volume of the far-field leakage sound, the fifth area of the fifth closed curve should not be too small, e.g., greater than 400 $mm^2$. In some embodiments, in order to ensure that the open earphone 1200 have a sufficient clamping force on the ear to improve wearing stability, the fifth area of the fifth closed curve should not be too large, e.g., less than 800 $mm^2$. In some embodiments, in order to ensure the sound production efficiency of the sound production component 1201 and a moderate clamping force and to avoid the foreign body sensation generated by the open earphone 1200 when worn, the fifth area of the fifth closed curve is in a range of 400 $mm^2$-800 $mm^2$.

In the wearing state, the open earphone 1200 forms a sixth projection on the sagittal plane of the human body. Similar to the fifth projection, the sixth projection also includes an outer contour, a first end contour, an inner contour, and a second end contour. The outer contour, the first end contour, the second end contour, and the tangent segment 1250 connecting the first end contour and the second end contour jointly define a sixth closed curve. As described above, the projection shape formed by the open earphone 1200 on the first plane projection is close to the projection shape formed by the open earphone 1200 in the sagittal projection of the human body, so that in the sixth projection, the contour boundary points, i.e., point P0, point P1, point Q0 and point Q1, in the non-wearing state, can still be used to describe the division of the individual contours in the sixth projection. That is, the outer contour, the first end contour, the inner contour, the second end contour, and the tangent segment 1250 in the sixth projection are all defined in a similar way to the contours of the fifth projection and are not repeated here. The area enclosed by the sixth closed curve is considered to be the area of the sixth projection (also known as the "sixth area"). In some embodiments, the sixth area may reflect the fit of the open earphone 1200 to the user's ear in the wearing state.

For reasons similar to the fifth area, an appropriate sixth area ensures that the open earphone 1200 can be listened to at a good volume at the listening position (e.g., antihelix), while maintaining a good cancellation of far-field sound leakage. In some embodiments, the sixth area is within a range of 400 $mm^2$-1100 $mm^2$. In some embodiments, the sixth area is within a range of 500 $mm^2$-900 $mm^2$ considering the elasticity of the ear hook 1202 and the comfort and stability of wearing the ear hook 1202.

In some embodiments, in order to avoid that the distance between the centroid O of the seventh projection and the projection of the first portion of the ear hook on the sagittal plane is too large to cause the sixth area to be too large, thus leading to unstable wearing and the problem that the region between the end FE of the sound production component 1201 and the inner contour 1014 of the auricle is relatively large, and avoid that the distance between the centroid O of the seventh projection and the projection of the first portion of the ear hook on the sagittal plane is too small to cause the sixth area to be too small, thus leading to poor wearing comfort and be unable to match with the antihelix region to achieve relatively good acoustic output quality, the distance between the centroid O of the seventh projection of the sound production component 1201 on the sagittal plane of the user and the first portion of the ear hook on the sagittal plane may be controlled to be within 8 mm-45 mm. By controlling the distance to be within the range of 8 mm-45 mm, the sixth area may be within a suitable range (e.g., a range of 500 $mm^2$-900 $mm^2$), then the first portion of the ear hook may fit well with the rear inner side of the auricle of the user when wearing the open earphone, and the sound production component 1201 may be ensured to be just located in on the antihelix region of the user, to make the sound production component 1201 form the baffle with the antihelix region and increase the sound path of the sound emitted from the pressure relief hole to the external ear canal 101, thereby increasing the sound path difference between the sound guiding hole and the pressure relief hole to the external ear canal 101, increasing the sound intensity at the external ear canal 101, and reducing the volume of far-field sound leakage. In addition, the distance between the centroid O of the seventh projection of the sound production component 1201 on the sagittal plane of the user and the projection of the first portion of the ear hook on the sagittal plane may be controlled to be within the range of 8 mm-45 mm, which may make the region between the end FE of the sound production component 1201 and the inner contour 1014 of the auricle minimized to reduce the acoustic short circuit region around the sound production component 1201, thereby increasing the listening volume at the ear canal opening of the user. In some embodiments, when at least part of the sound production component 1201 covers the antihelix region, in order to further increase the area of the region of the sound production component 1201 abutting against the antihelix region and improve the acoustic output quality, the distance between the centroid O of the seventh projection of the sound production component 1201 on the sagittal plane of the user and the first portion 121 of the ear hook on the sagittal plane should not be too small, e.g., greater than 15 mm. In some embodiments, in order to further improve the wearing stability of the open earphone, the distance between the centroid O of the seventh projection of the sound production component 1201 on the sagittal plane of the user and the first portion of the ear hook on the sagittal plane should not be too large, e.g., less than 33 mm. In some embodiments, in order to consider the acoustic output quality and the wearing stability, the distance between the centroid O of the seventh projection of the sound production component 1201 on the sagittal plane of the user and the first portion of the ear hook on the sagittal plane may be within a range of 15 mm-33 mm. In some embodiments, in order to further improve the wearing comfort, the distance between the centroid O of the seventh projection of the sound production component 1201 on the sagittal plane of the user and the first portion of the ear hook on the sagittal plane may be within a range of 20 mm-25 mm.

In some embodiments, the ear hook may be elastic, and may deform to a certain extent in the wearing state compared with the non-wearing state. For example, in some embodiments, the distance between the centroid O of the seventh projection of the sound production component 1201 on the sagittal plane of the user and the first portion of the ear hook on the sagittal plane in the wearing state may be greater than that in the non-wearing state. In some embodiments, if the distance between the centroid of the projection of the sound production component 1201 on the first plane and the projection of the first portion of the ear hook on the first plane is too large, the fifth area may be too large, which results in unstable wearing and makes the region between the end EF of the sound production component 1201 and the inner contour 1014 of the auricle too large. If the distance between the centroid of the projection of the sound production component 1201 on the first plane and the projection of the first portion of the ear hook on the first plane is too small, the fifth area may be too small, which leads to poor wearing comfort and failure to cooperate with the region of the antihelix region to achieve a better acoustic output quality. In order to solve the above problem, in some embodiments, when the open earphone 1200 is in the non-wearing state, the distance between the centroid of the projection of the sound production component 1201 on the first plane and the projection of the first portion of the ear hook on the first plane may be within a range of 10 mm-50 mm. By controlling the distance to be within a range of 10 mm-50 mm, the fifth area is within a suitable range (e.g., a range of 400 $mm^2$-800 $mm^2$), then the first portion of the ear hook may fit well with the rear inner side of the auricle of the user when wearing the open earphone, and the sound production component 1201 may be just located in on the antihelix region of the user, to make the sound production component 1201 form the baffle with the antihelix region and increase the sound path of the sound emitted from the pressure relief hole to the external ear canal 101, thereby increasing the sound path difference between the sound guiding hole and the pressure relief hole to the external ear canal 101, increasing the sound intensity at the external ear canal 101, and reducing the volume of far-field sound leakage. In some embodiments, when at least part of the sound production component 1201 covers the antihelix region, in order to further increase the area of the region of the sound production component 1201 abutting against the antihelix region and improve the acoustic output quality, in the non-wearing state of the open earphone 1200, the distance between the centroid of the projection of the sound production component 1201 on the first plane and the projection of the first portion of the ear hook on the first plane should not be too small, e.g., greater than 32 mm. In some embodiments, in order to further improve the wearing stability of the open earphone, in the non-wearing state of the open earphone 1200, the distance between the centroid of the projection of the sound production component 1201 on the first plane and the projection of the first portion of the ear hook on the first plane should not be too large, e.g., less than 40 mm. In some embodiments, in order to consider the acoustic output quality and the wearing stability, in the non-wearing state of the open earphone 1200, the distance between the centroid of the projection of the sound production component 1201 on the first plane and the projection of the first portion of the ear hook on the first plane may be within a range of 32 mm-40 mm. It may be appreciated that, in some embodiments, by making the distance between the centroid of the projection of the sound production component 1201 on the first plane and the projection of the first portion of the ear hook on the first plane in the non-wearing state slightly smaller than that in the wearing state, make the ear hook and the sound production component of the open earphone 10 clamp the user's ear to a certain extent in the wearing state, so as to make it possible to improve the stability of the user wearing the open earphone without affecting the user's wearing experience.

In some embodiments, when the open earphones 1200 is in the wearing state and at least part of the sound production component 1201 covers the antihelix region of the user, a distance between the centroid O of the seventh projection of the sound production component 1201 and the centroid Q of the projection of the battery compartment 1203 on the sagittal plane may vary to a certain extent compared with the wearing manner in which the at least part of the sound production component 1201 extends into the inferior concha of the user. It may be the same as the wearing manner in which at least part of the sound production component 1201 extends into the inferior concha of the user, in the wearing state, the position of the sound production component 1201 needs to be partially or integrally cover the antihelix region, and the position is relatively fixed. If the distance between the centroid O of the seventh projection of the sound production component 1201 and the centroid Q of the projection of the battery compartment 1203 on the sagittal plane is too small, the battery compartment 1203 may be close to or even pressed on the rear side of the auricle, which affects the wearing comfort of the user. Furthermore, when the distance between the centroid O of the seventh projection of the sound production component 1201 and the centroid Q of the projection of the battery compartment 1203 on the sagittal plane is too small, the length of the first portion of the ear hook may also be relatively short, which may result in a relatively small sixth area, thus affecting the wearing comfort of the user. If the distance between the centroid O of the seventh projection of the sound production component 1201 and the centroid Q of the projection of the battery compartment 1203 on the sagittal plane is too large, the length of the first portion of the ear hook may also be relatively large, which may result in a relatively large sixth area, thus affecting the wearing stability of the open earphone 1200. Based on this, in some embodiments, the distance between the centroid O of the seventh projection of the sound production component 1201 and the centroid Q of the projection of the battery compartment 1203 on the sagittal plane is within a range of 23 mm-40 mm. In some embodiments, in order to prevent the sixth area from being too small and affecting the user's wearing comfort, the distance between the centroid O of the seventh projection of the sound production component 1201 and the centroid Q of the projection of the battery compartment 1203 on the sagittal plane should not be too small in the wearing state, e.g., greater than 25 mm. In some embodiments, in order to prevent the sixth area from being too large and thus affecting the wearing stability of the user, in the wearing state, the distance between the centroid O of the seventh projection of the sound production component 1201 and the centroid Q of the projection of the battery compartment 1203 on the sagittal plane should not be too large, e.g., less than 31 mm. In some embodiments, in order to enable the user to wear the open earphone 1200 with better stability and comfort, the distance between the centroid O of the seventh projection of the sound production component 1201 and the centroid Q of the projection of the battery compartment 1203 on the sagittal plane may be within a range of 25 mm-31 mm in the wearing state.

Due to the elasticity of the ear hook, in the wearing state and the non-wearing state of the open earphone 10, the distance (fifth distance) between the centroid O of the projection corresponding to the sound production component 1201 and the centroid Q of the projection corresponding to the battery compartment 1203 of the open earphone 1200 may vary. In some embodiments, in order to prevent the fifth area from being too large and affecting the wearing stability of the user, a distance (fifth distance) between the centroid O of the projection of the sound production component 1201 on the first plane and the centroid Q of the projection of the battery compartment 1203 on the first plane in the non-wearing state may be within a range of 16.7 mm-25 mm. In some embodiments, in order to prevent the fifth area from being too small and affecting the user's wearing comfort, in the non-wearing state, the distance between the centroid O of the projection of the sound production component 1201 on the first plane and the centroid Q of the projection of the battery compartment 1203 on the first plane may be within a range of 23 mm-31 mm. In some embodiments, in order to enable the user to wear the open earphone 1200 with better stability and comfort, in the non-wearing state, the distance (fifth distance) between the centroid O of the projection of the sound production component 1201 on the first plane and the centroid Q of the projection of the battery compartment 1203 on the first plane may be within a range of 23 mm-25 mm.

In some embodiments, in order to ensure that the user wears the open earphone 1200 with the sound production component 1201 close to the antihelix position, but also to reduce the load on the user while wearing it and to facilitate the user's daily wear when accessing ambient sound or daily communication. In some embodiments, a ratio of the projection area of the sound production component 1201 on the first plane of the human body to the fifth area is within a range of 0.3-0.85. In some embodiments, in order to increase the area of the region of the sound production component 1201 abutting against the antihelix region and improve the acoustic output quality, in the non-wearing state, the ratio of the projection area of the sound production component 1201 on the first plane of the human body to the fifth area should not be too small, e.g., greater than 0.4. In some embodiments, in order to prevent the sound production component 1201 from being oversized and forming an obstruction to the ear, in the non-wearing state, the ratio of the projection area of the sound production component 1201 on the first plane of the human body to the fifth area should not be too large, e.g., less than 0.75. In some embodiments, in order to improve the acoustic output quality of the sound production component 1201 and prevent the sound production component 1201 from forming an obstruction to the ear, the ratio of the projection area of the sound production component 1201 on the first plane of the human body to the fifth area is within a range of 0.4-0.75.

For reasons similar to the fifth area, in the wearing state, an appropriate ratio of the projection area of the sound production component 1201 on the sagittal plane of the human body to the sixth area may reduce the load on the user while wearing the open earphone 1200. In some embodiments, a ratio of the projection area of the sound production component 1201 on the sagittal plane of the human body to the sixth area in the wearing state is within a range of 0.25-0.9. In some embodiments, in order to increase the area of the region of the sound production component 1201 abutting against the antihelix region and improve the acoustic output quality, in the wearing state, the ratio of the projection area of the sound production component 1201 on the sagittal plane of the human body to the sixth area should not be too small, e.g., greater than 0.35. In some embodiments, in order to prevent the size of the sound production component 1201 from being too large and forming an obstruction to the ear, in the wearing state, the ratio of the projection area of the sound production component 1201 on the sagittal plane of the human body to the sixth area should not be too large, e.g., less than 0.75. In some embodiments, in order to improve the acoustic output quality of the sound production component 1201 and prevent the sound production component 1201 from forming an obstruction to the ear, the ratio of the projection area of the sound production component 1201 on the sagittal plane of the human body to the sixth area is within a range of 0.35-0.75.

The whole or part structure of the sound production component 1201 may cover the antihelix region to form a baffle. The listening effect when the user wears the open earphone 1200 may be related to a distance between the sound guiding hole and the pressure relief hole of the sound production component 1201. The closer the distance between the sound guiding hole and the pressure relief hole, the more the sound emitted from the sound guiding hole and the pressure relief hole cancels out at the ear canal opening of the user, and the lower the listening volume at the ear canal opening of the user. The distance between the sound guiding hole and the pressure relief hole may be related to the size of the sound production component 1201. For example, the sound guiding hole may be arranged on a sidewall (e.g., the lower sidewall or the inner side) of the sound production component 1201 close to the ear canal opening of the user. The pressure relief hole may be arranged on a sidewall (e.g., the upper sidewall or the outer side) of the sound production component 1201 away from the ear canal opening of the user. Therefore, the size of the sound production component may affect the listening volume at the ear canal opening of the user. For example, if the size is too large, pressure may be brought to most region of the ear, affecting the wearing comfort of the user and the convenience of carrying around. In some embodiments, a distance between the midpoint of the projection of the upper sidewall 111 of the sound production component 1201 on the sagittal plane and a projection of the upper vertex of the ear hook on the sagittal plane and a distance between the midpoint of the projection of the lower sidewall 112 of the sound production component 1201 on the sagittal plane and the projection of the upper vertex of the ear hook on the sagittal plane may reflect the size of the sound production component 1201 along the short-axis direction Z. In order to improve the listening effect of the open earphone 1200 while ensuring that the open earphone 1200 does not block the ear canal opening of the user, in some embodiments, the distance between the midpoint of the projection of the upper sidewall 111 of the sound production component 1201 on the sagittal plane and the projection of the upper vertex of the ear hook on the sagittal plane may be within a range of 13 mm-20 mm, and the distance between the midpoint of the projection of the lower sidewall 112 of the sound production component 1201 on the sagittal plane and the projection of the upper vertex of the ear hook on the sagittal plane may be within a range of 22 mm-36 mm. In some embodiments, the distance between the midpoint of the projection of the upper sidewall 111 of the sound production component 1201 on the sagittal plane and the projection of the upper vertex of the ear hook on the sagittal plane and the distance between the midpoint of the projection of the lower sidewall 112 of the sound production component 1201 on the sagittal plane and the projection of the upper vertex of the ear hook on the sagittal plane may also reflect the size of the sixth area. Specifically, the smaller the distance between the midpoint of the projection of the upper sidewall 111 of the sound production component 1201 on the sagittal plane and the projection of the upper vertex of the ear hook on the sagittal plane or the distance between the midpoint of the projection of the lower sidewall 112 of the sound production component 1201 on the sagittal plane and the projection of the upper vertex of the ear hook on the sagittal plane, the smaller size of the sixth area, and the larger the distance between the midpoint of the projection of the upper sidewall 111 of the sound production component 1201 on the sagittal plane and the projection of the upper vertex of the ear hook on the sagittal plane or the distance between the midpoint of the projection of the lower sidewall 112 of the sound production component 1201 on the sagittal plane and the projection of the upper vertex of the ear hook on the sagittal plane, the larger the sixth area. In order to ensure that the sound production component 1201 may cover the antihelix region in the wearing state and make the sixth area within a suitable range to improve the acoustic output quality of the sound production component 1201, in some embodiments, the distance between the midpoint of the projection of the upper sidewall 111 of the sound production component 1201 on the sagittal plane and the projection of the upper vertex of the ear hook on the sagittal plane may be within a range of 14 mm-19.5 mm, and the distance between the midpoint of the projection of the lower sidewall 112 of the sound production component 1201 on the sagittal plane and the projection of the upper vertex of the ear hook on the sagittal plane may be within a range of 22.5 mm-35 mm. In some embodiments, in order to further improve the wearing stability and comfort of the open earphone 1200, the distance between the midpoint of the projection of the upper sidewall 111 of the sound production component 1201 on the sagittal plane and the projection of the upper vertex of the ear hook on the sagittal plane may be within a range of 15 mm-18 mm, and the distance between the midpoint of the projection of the lower sidewall 112 of the sound production component 1201 on the sagittal plane and the projection of the upper vertex of the ear hook on the sagittal plane may be within a range of 26 mm-30 mm.

The basic concept has been described above. Obviously, for those skilled in the art, the above detailed disclosure is only an example, and does not constitute a limitation to the present disclosure. Although not explicitly stated here, those skilled in the art may make various modifications, improvements, and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, "one embodiment", "an embodiment", and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, some features, structures, or features in the present disclosure of one or more embodiments may be appropriately combined.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. An open earphone, comprising:

a sound production component; and an ear hook including a first portion and a second portion connected in sequence, wherein the first portion is hung between an auricle of a user and the head of the user, the second portion extends toward a front outer side of the auricle and connects to the sound production component, and the sound production component is located close to an ear canal but does not block the opening of the ear canal, wherein:

the open earphone and the auricle have a first projection and an eighth projection on a sagittal plane, respectively, a centroid of a portion of the first projection corresponding to the sound production component have a first distance to a highest point of the eighth projection in a vertical axis direction, a ratio of the first distance to a height of the eighth projection in the vertical axis direction is within a range of 0.35-0.6; and in a non-wearing state, a distance from a centroid of a projection of the sound production component on a first plane to a projection of the first portion of the ear hook in the first plane is within a range of 13 mm-38 mm.

2. The open earphone of claim 1, wherein in the non-wearing state, the first projection includes an outer contour, a first end contour, an inner contour, and a second end contour, the inner contour, the first end contour, the second end contour, and a tangent segment connecting the first end contour and the second end contour jointly define a third closed curve, and a third area of the third closed curve is within a range of 300 $mm^2$-500 $mm^2$.

3. The open earphone of claim 1, wherein in the non-wearing state, an included angle between a connection line and a long axis of the portion of the first projection corresponding to the sound production component is within a range of 55°-85°, the connection line connecting a projection of a mass center of the open earphone on the sagittal plane and a polar point of the ear hook in a first direction.

4. The open earphone of claim 1, further comprising a battery compartment, wherein the battery compartment is located at an end of the ear hook away from the sound production component; and in the non-wearing state, a distance from the centroid of the projection of the sound production component on the first plane to a centroid of a projection of the battery compartment on the first plane is within a range of 16.7 mm-25 mm.

5. The open earphone of claim 2, wherein the tangent segment is tangent to the first end contour at a first tangent point and tangent to the second end contour at a second tangent point, and in the non-wearing state, an area of a triangle formed by the first tangent point, the second tangent point, and a polar point of the projection of the ear hook in the first plane is within a range of 150 $mm^2$-190 $mm^2$.

6. The open earphone of claim 2, wherein the outer contour, the first end contour, the second end contour, and the tangent segment connecting the first end contour and the second end contour jointly define a first closed curve, and in the non-wearing state, a first area of the first closed curve is within a range of 1000 $mm^2$-1500 $mm^2$.

7. The open earphone of claim 6, wherein in the non-wearing state, a ratio of an area of the portion of the first projection corresponding to the sound production component to the first area is within a range of 0.25-0.4.

8. The open earphone of claim 1, wherein in a wearing state, the open earphone forms a second projection on the sagittal plane, the second projection includes an outer contour, a first end contour, an inner contour, and a second end contour, the inner contour, the first end contour, the second end contour, and a tangent segment connecting the first end contour and the second end contour jointly define a fourth closed curve, and a fourth area of the fourth closed curve is within a range of 450 $mm^2$-750 $mm^2$.

9. The open earphone of claim 8, wherein in the wearing state, a distance from a centroid of a portion of the second projection corresponding to the sound production component to the projection of the first portion of the ear hook on the sagittal plane is within a range of 18 mm-43 mm.

10. The open earphone of claim 8, further comprising a battery compartment, wherein the battery compartment is located at an end of the ear hook away from the sound production component; and in the wearing state, a distance from a centroid of a portion of the second projection corresponding to the sound production component to a centroid of a projection of the battery compartment on the sagittal plane is within a range of 20 mm-30 mm.

11. The open earphone of claim 8, wherein in the wearing state, the outer contour, the first end contour, the second end contour, and the tangent segment connecting the first end contour and the second end contour jointly define a second closed curve, and a second area of the second closed curve is within a range of 1100 $mm^2$-1700 $mm^2$.

12. The open earphone of claim 8, wherein in the wearing state, a distance from a midpoint of an upper side wall of a portion of the second projection corresponding to the sound production component to a projection of an upper vertex of the ear hook on the sagittal plane is within a range of 21 mm-32 mm; and a distance from a midpoint of a lower side wall of the sound production component and the projection of the upper vertex of the ear hook on the sagittal plane is within a range of 32 mm-48 mm.

13. An open earphone, comprising:

a sound production component; and an ear hook including a first portion and a second portion connected in sequence, wherein the first portion is hung between an auricle of a user and the head of the user, the second portion extends toward a front outer side of the auricle and is connected to the sound production component, and the sound production component is located close to an ear canal but does not block the opening of the ear canal, wherein:

the open earphone and the auricle have a first projection and an eighth projection on a sagittal plane, respectively, a centroid of a portion of the first projection corresponding to the sound production component have a first distance from a highest point of the eighth projection in a vertical axis direction, a ratio of the first distance to a height of the eighth projection in the vertical axis direction is within a range of 0.25-0.4; and in a non-wearing state, a distance from a centroid of a projection of the sound production component on a first plane to a centroid of a projection of a first portion of the ear hook in the first plane is within a range of 10 mm-50 mm.

14. The open earphone of claim 13, wherein in the non-wearing state, the open earphone forms a fifth projection on the first plane, the fifth projection includes an outer contour, a first end contour, an inner contour, and a second end contour, the outer contour, the first end contour, the second end contour, and a tangent segment connecting the first end contour and the second end contour jointly define a fifth closed curve, and a fifth area of the fifth closed curve is within a range of 400 $mm^2$-800 $mm^2$.

15. The open earphone of claim 13, further comprising a battery compartment, wherein the battery compartment is located at an end of the ear hook away from the sound production component; and in the non-wearing state, a distance from the centroid of the projection of the sound production component on the first plane to a centroid of a projection of the battery compartment on the first plane is within a range of 20 mm-31 mm.

16. The open earphone of claim 14, wherein in the non-wearing state, a ratio of a projection area of the sound production component on the first plane to the fifth area is within a range of 0.4-0.75.

17. The open earphone of claim 13, wherein in a wearing state, the open earphone forms a sixth projection on the sagittal plane, the sixth projection includes an outer contour, a first end contour, an inner contour, and a second end contour, the outer contour, the first end contour, the second end contour, and a tangent segment connecting the first end contour and the second end contour jointly define a sixth closed curve, and a sixth area of the sixth closed curve is within a range of 500 $mm^2$-900 $mm^2$.

18. The open earphone of claim 17, wherein in the wearing state, a distance from a centroid of a projection of the sound production component on the sagittal plane to a projection of the first portion of the ear hook on the sagittal plane is within a range of 8 mm-45 mm.

19. The open earphone of claim 17, further comprising a battery compartment, wherein the battery compartment is located at an end of the ear hook away from the sound production component; and in the wearing state, the distance from the centroid of the projection of the sound production component on the sagittal plane and a centroid of a projection of the battery compartment on the sagittal plane is within a range of 25 mm-40 mm, The open earphone of claim 17, wherein in the wearing state, a ratio of a projection area of the sound production component on the sagittal plane to the sixth area is within a range of 0.35-0.75.

* * * * *